(12) United States Patent
Hashizume

(10) Patent No.: US 12,539,668 B2
(45) Date of Patent: Feb. 3, 2026

(54) MOLDING STAGE AND THREE-DIMENSIONAL MOLDING APPARATUS

(71) Applicant: SEIKO EPSON CORPORATION, Tokyo (JP)

(72) Inventor: Keitaro Hashizume, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 126 days.

(21) Appl. No.: 18/666,954

(22) Filed: May 17, 2024

(65) Prior Publication Data

US 2024/0383197 A1 Nov. 21, 2024

(30) Foreign Application Priority Data

May 19, 2023 (JP) .................................. 2023-082819

(51) Int. Cl.
*B29C 64/245* (2017.01)
*B29C 64/321* (2017.01)
*B33Y 30/00* (2015.01)

(52) U.S. Cl.
CPC .......... *B29C 64/245* (2017.08); *B29C 64/321* (2017.08); *B33Y 30/00* (2014.12)

(58) Field of Classification Search
CPC ... B29C 64/245; B29C 64/321; B29C 64/209; B33Y 30/00; B33Y 40/00
See application file for complete search history.

(56) References Cited

U.S. PATENT DOCUMENTS

| | | | | |
|---|---|---|---|---|
| 2015/0056321 | A1* | 2/2015 | Zhang | B29C 64/35 425/225 |
| 2020/0061914 | A1* | 2/2020 | Onishi | B29C 64/393 |
| 2020/0238446 | A1* | 7/2020 | Worthing, Jr. | B23K 26/34 |

FOREIGN PATENT DOCUMENTS

JP 2017200727 A * 11/2017 ............. B33Y 30/00

* cited by examiner

*Primary Examiner* — Galen H Hauth
*Assistant Examiner* — Mohamed K Ahmed Ali
(74) *Attorney, Agent, or Firm* — Harness, Dickey & Pierce, P.L.C.

(57) ABSTRACT

A molding stage includes a base which includes a molding surface, in which a first through hole penetrating the base along a first intersecting axis crossing a vertical axis perpendicular to the molding surface and a second through hole penetrating the base along a second intersecting axis crossing the vertical axis and the first through hole are formed, a first slide member which is inserted into the first through hole, and which is configured to slide along the first intersecting axis between a first protruding position where the first slide member protrudes from the first through hole and a first housed position where the first slide member is housed in the first through hole, and a second slide member which is inserted into the second through hole, and which is configured to slide along the second intersecting axis between a second protruding position where the second slide member protrudes from the second through hole and a second housed position where the second slide member is housed in the second through hole.

8 Claims, 30 Drawing Sheets

MOLDING STAGE AND THREE-DIMENSIONAL MOLDING APPARATUS

The present application is based on, and claims priority from JP Application Serial Number 2023-082819, filed May 19, 2023, the disclosure of which is hereby incorporated by reference herein in its entirety.

BACKGROUND

1. Technical Field

The present disclosure relates to a molding stage and a three-dimensional molding apparatus.

2. Related Art

In the past, there has been known a three-dimensional molding apparatus capable of shaping a three-dimensional molding object on a molding stage. JP-A-2017-200727 discloses, as an example of a molding stage, a stage including an upper plate in which through holes are formed and a lower plate having protruding parts to be inserted into the through holes. At the time of shaping, the protruding parts protrude from an upper surface of the upper plate to thereby enhance a fixing property between the molding stage and the three-dimensional molding object. After the shaping, the protruding parts are retracted below the upper surface of the upper plate, and thus, the three-dimensional molding object can be separated from the molding stage. JP-A-2017-200727 discloses a configuration in which the through holes and the protruding parts are inclined with respect to a horizontal surface.

JP-A-2017-200727 is an example of the related art.

In the molding stage disclosed in JP-A-2017-200727, the inclination directions of all the through holes are uniform. When viewed in cross section, there are a place where an angle formed between a circumference of one of the protruding parts and the horizontal surface is an acute angle and a place where that angle is an obtuse angle. When the inclination directions of all the through holes are uniform, the direction of the place where the angle formed between the circumference of the protruding part and the horizontal surface is the obtuse angle becomes uniform in all the through holes. There is room for improvement in related-art molding stages.

SUMMARY

A molding stage includes a base which includes a molding surface on which a molding material to be used in three-dimensional molding is deposited, in which a first through hole penetrating the base along a first intersecting axis crossing a vertical axis perpendicular to the molding surface and a second through hole penetrating the base along a second intersecting axis crossing the vertical axis are formed, and in which the first intersecting axis and the second intersecting axis cross each other, a first slide member which is inserted into the first through hole, and which is configured to slide along the first intersecting axis between a first protruding position where the first slide member protrudes from the first through hole and a first housed position where the first slide member is housed inside the first through hole, and a second slide member which is inserted into the second through hole, and which is configured to slide along the second intersecting axis between a second protruding position where the second slide member protrudes from the second through hole and a second housed position where the second slide member is housed inside the second through hole.

A three-dimensional molding apparatus includes the molding stage described above, a discharge unit including a nozzle configured to discharge the molding material, and a control unit configured to control the molding stage and the discharge unit, wherein the control unit is configured to control at least one of the nozzle and the molding stage such that a moving direction of the nozzle crosses the first through hole and the second through hole in a plan view of the molding surface.

A three-dimensional molding apparatus includes the molding stage described above, a discharge unit configured to discharge the molding material to the molding stage, and a supply device configured to supply a granular material, which is a raw material of the molding material, to the discharge unit, wherein the supply device includes a container configured to house a plurality of the granular materials, and a roller disposed inside the container, the container includes two inner walls opposed to each other, the two inner walls have elasticity, an outer circumference of the roller is sandwiched between the two inner walls, and at least one of a convex portion and a concave portion is formed on the outer circumference of the roller.

A three-dimensional molding apparatus includes the molding stage described above, a discharge unit configured to discharge the molding material to the molding stage, and a supply device configured to supply a granular material, which is a raw material of the molding material, to the discharge unit, wherein the supply device includes a mesh having a cylindrical shape and configured to house a plurality of the granular materials, a spiral slope disposed on an inner wall of the mesh, a cylindrical body disposed outside the mesh and surrounding the mesh, a rotation device configured to rotate at least one of the mesh and the cylindrical body around a central axis of the cylindrical body, and a suction device configured to suck a gas located inside the cylindrical body.

DESCRIPTION OF EMBODIMENTS

Figure 1:
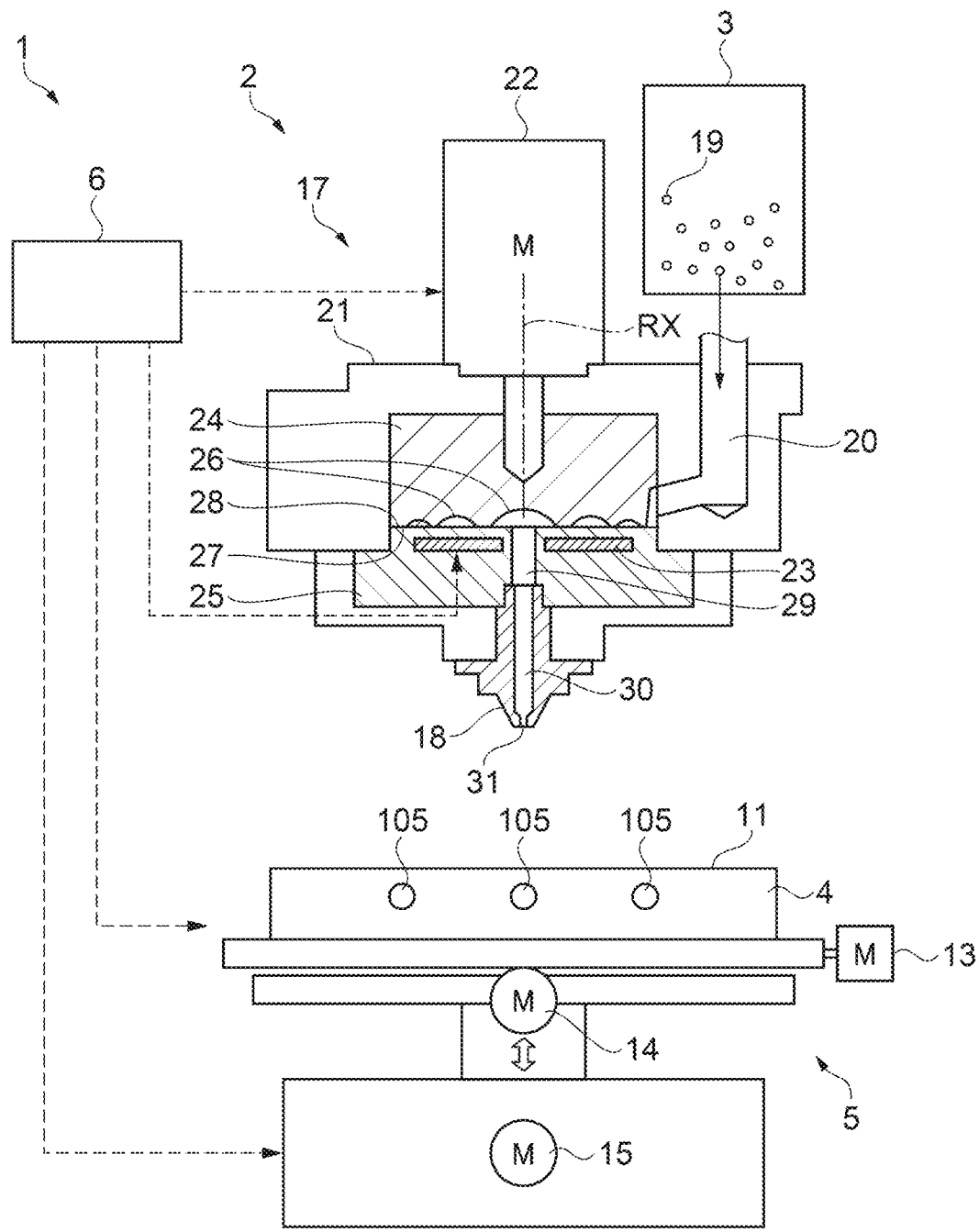
FIG. 1 is a diagram illustrating a configuration of a three-dimensional molding apparatus.

As shown in FIG. 1, a three-dimensional molding apparatus 1 includes a discharge unit 2, a supply device 3, a molding stage 4, a moving mechanism unit 5, and a control unit 6. The three-dimensional molding apparatus 1 is capable of changing a relative position between the discharge unit 2 and the molding stage 4 while discharging a molding material from the discharge unit 2 toward the molding stage 4. The relative position between the discharge unit 2 and the molding stage 4 is determined by moving the molding stage 4 with the moving mechanism unit 5. The relative position between the discharge unit 2 and the molding stage 4 can also be realized by moving the discharge unit 2. Furthermore, the relative position between the discharge unit 2 and the molding stage 4 can also be realized by moving both the molding stage 4 and the discharge unit 2.

The operation of the three-dimensional molding apparatus 1 is controlled by the control unit 6. The three-dimensional molding apparatus 1 is capable of shaping the three-dimensional molding object having a desired shape on a molding surface 11 of the molding stage 4. The "surface" as in the molding surface 11 includes not only a surface formed only of planes but also a surface that can be grasped as a surface occupying a certain region. The surface may be, for example, a surface with asperity. Note that shaping a three-dimensional molding object may be referred to as three-dimensional molding. The molding material is also referred to as a molten material in some cases.

In FIG. 1, an X axis, a Y axis, and a Z axis are illustrated. The X axis, the Y axis, and the Z axis are coordinate axes orthogonal to each other. In the drawings described hereinafter, the X axis, the Y axis, and the Z axis are illustrated as necessary. In this case, the X axis, the Y axis, and the Z axis in each drawing correspond to the X axis, the Y axis, and the Z axis in FIG. 1. FIG. 1 shows state in which the three-dimensional molding apparatus 1 is disposed on an X-Y plane defined by the X axis and the Y axis. In the present embodiment, a state in which the three-dimensional molding apparatus 1 is disposed on the X-Y plane in a state in which the X-Y plane coincides with a horizontal plane corresponds to a use state of the three-dimensional molding apparatus 1. A posture of the three-dimensional molding apparatus 1 when the three-dimensional molding apparatus 1 is disposed on the X-Y plane that coincides with the horizontal plane is called a use posture of the three-dimensional molding apparatus 1.

In some cases, the X axis, the Y axis, and the Z axis are described in the drawings and descriptions showing a constituent or a unit of the three-dimensional molding apparatus 1. In this case, the X axis, the Y axis, and the Z axis mean the X axis, the Y axis, and the Z axis in a state where the constituent or the unit is incorporated in the three-dimensional molding apparatus 1. Further, a posture of each of the constituents or the unit in the use posture of the three-dimensional molding apparatus 1 is called the use posture of that constituent or that unit. Further, in the following descriptions of the three-dimensional molding apparatus 1, the constituents, the units, and so on, they are described in their respective use postures unless otherwise specified.

When the three-dimensional molding apparatus 1 is actually used, it is sufficient for the horizontal plane to be a substantially horizontal plane. The expression of "substantially horizontal" may include some inclination in an allowable inclination range, for example, with regard to the plane on which the three-dimensional molding apparatus 1 is placed when the three-dimensional molding apparatus 1 is used. For this reason, the substantially horizontal surface is not limited to a surface of, for example, a surface plate formed with high accuracy. The substantially horizontal surface includes various surfaces such as a desk, a table, a shelf, and a floor on which the three-dimensional molding apparatus 1 is placed when the three-dimensional molding apparatus 1 is used. A vertical direction is not limited to a direction strictly parallel to the gravitational direction, and includes a perpendicular direction with respect to the substantially horizontal plane. Therefore, when the substantially horizontal plane is a surface of, for example, a desk, a table, a shelf, a floor, or the like, the vertical direction means a perpendicular direction with respect to such a surface.

Arrows are given to the X axis, the Y axis, and the Z axis. In each of the X axis, the Y axis, and the Z axis, the direction of the arrow indicates a positive (+) direction, and the direction opposite to the direction of the arrow indicates a negative (−) direction. The Z axis is an axis orthogonal to the X-Y plane. In the use state of the three-dimensional molding apparatus 1, the +Z direction is a vertically upward direction. In the use state of the three-dimensional molding apparatus 1, the −Z direction is a vertically downward direction in FIG. 1. Viewing the X-Y plane in the −Z direction is called a plan view.

The molding stage 4 may be displaced along each of the X axis, the Y axis, and the Z axis by being driven by the moving mechanism unit 5. The molding stage 4 is capable of reciprocating along the X axis by being driven by the moving mechanism unit 5. The molding stage 4 is capable of reciprocating along the Y axis by being driven by the moving mechanism unit 5. The molding stage 4 is capable of reciprocating along the Z axis by being driven by the moving mechanism unit 5.

The moving mechanism unit 5 includes an X motor 13, a Y motor 14, and a Z motor 15. Driving of the X motor 13, the Y motor 14, and the Z motor 15 is controlled by the control unit 6. The moving mechanism unit 5 moves the molding stage 4 along the X axis with driving force of the X motor 13. The moving mechanism unit 5 moves the molding stage 4 along the Y axis with driving force of the Y motor 14. The moving mechanism unit 5 moves the molding stage 4 along the Z axis with driving force of the Z motor 15.

The discharge unit 2 includes a plasticizing unit 17 and a nozzle 18. The plasticizing unit 17 melts a granular material 19 as a raw material of the molding material to form the molding material. The nozzle 18 discharges the molding material. The supply device 3 supplies the granular material 19 to the discharge unit 2. The granular material 19 is a resin material granulated. The granular material 19 also includes a pellet-shaped material or a powdery material. The granular material 19 supplied from the supply device 3 to the discharge unit 2 is supplied to the plasticizing unit 17 via a supply path 20.

The plasticizing unit 17 includes a screw case 21, a drive motor 22, heaters 23, a screw 24, and a barrel 25. The plasticizing unit 17 plasticizes at least a part of the material supplied from the supply path 20 to generate a paste-like molding material having fluidity, and supplies the molded material to the nozzle 18. The term "plasticization" means that heat is applied to a material having thermal plasticity to melt the material. The term "melt" means not only heating the material having the thermal plasticity to a temperature equal to or higher than a melting point into a liquid, but also heating the material having the thermal plasticity to a temperature equal to or higher than a glass transition point to thereby soften the material and develop the fluidity. Note that the screw 24 in the present embodiment is formed of a flat screw.

The screw case 21 is a chassis for housing the screw 24. The barrel 25 is fixed to a lower surface of the screw case 21. The screw 24 is housed in a space surrounded by the screw case 21 and the barrel 25. The drive motor 22 is fixed to an upper surface of the screw case 21. The screw 24 has a substantially cylindrical shape in which a height in a direction along the Z axis is smaller than a diameter. The screw 24 has a groove forming surface 27 on which screw grooves 26 are formed on a surface facing the barrel 25. Specifically, the groove forming surface 27 is opposed to a screw opposed surface 28 of the barrel 25. The screw 24 is configured to be rotatable about a central axis RX as a rotation axis.

The drive motor 22 is located at the +Z direction side of the screw 24. The drive motor 22 is coupled to a surface at an opposite side to the groove forming surface 27 of the screw 24. The drive motor 22 generates power for rotating the screw 24. The screw 24 rotates centering on the central axis RX with the power from the drive motor 22. Driving of the drive motor 22 is controlled by the control unit 6. The drive motor 22 is not required to directly be coupled to the screw 24. For example, the screw 24 and the drive motor 22 may be coupled to each other via a speed reducer.

The barrel 25 is located at the −Z direction side of the screw 24. The barrel 25 is disposed to be opposed to the groove forming surface 27 of the screw 24. The barrel 25 has the screw opposed surface 28 opposed to the groove forming surface 27 of the screw 24. The barrel 25 is provided with a communication hole 29 on the central axis RX of the screw 24. The molding material generated by the plasticizing unit 17 is supplied to the nozzle 18 via the communication hole 29. The heaters 23 are embedded in the barrel 25. The barrel 25 is provided with the two heaters 23 shaped like rods extending along the Y axis. The heaters 23 heat the material supplied between the screw 24 and the barrel 25. Driving of the heaters 23 is controlled by the control unit 6.

The nozzle 18 is disposed at the −Z direction side of the barrel 25. The nozzle 18 is provided with a nozzle flow path 30 and a nozzle hole 31. The nozzle flow path 30 is a flow channel disposed in the nozzle 18. The nozzle flow path 30 is communicated with the communication hole 29 of the barrel 25. The nozzle hole 31 opens in an end portion at the −Z direction side of the nozzle 18. The nozzle hole 31 is the end portion at the −Z direction side of the nozzle flow path 30. The nozzle hole 31 includes a portion which is disposed in the end portion at the −Z direction side of the nozzle flow path 30, and in which the flow channel cross section is reduced. The molding material supplied from the plasticizing unit 17 to the nozzle flow path 30 is discharged from the nozzle hole 31. In the present embodiment, the opening shape of the nozzle hole 31 is a circular shape. Note that the opening shape of the nozzle hole 31 is not limited to the circular shape, and may be an ellipse, a rectangle, a polygon other than a rectangle, or the like.

Figure 2:
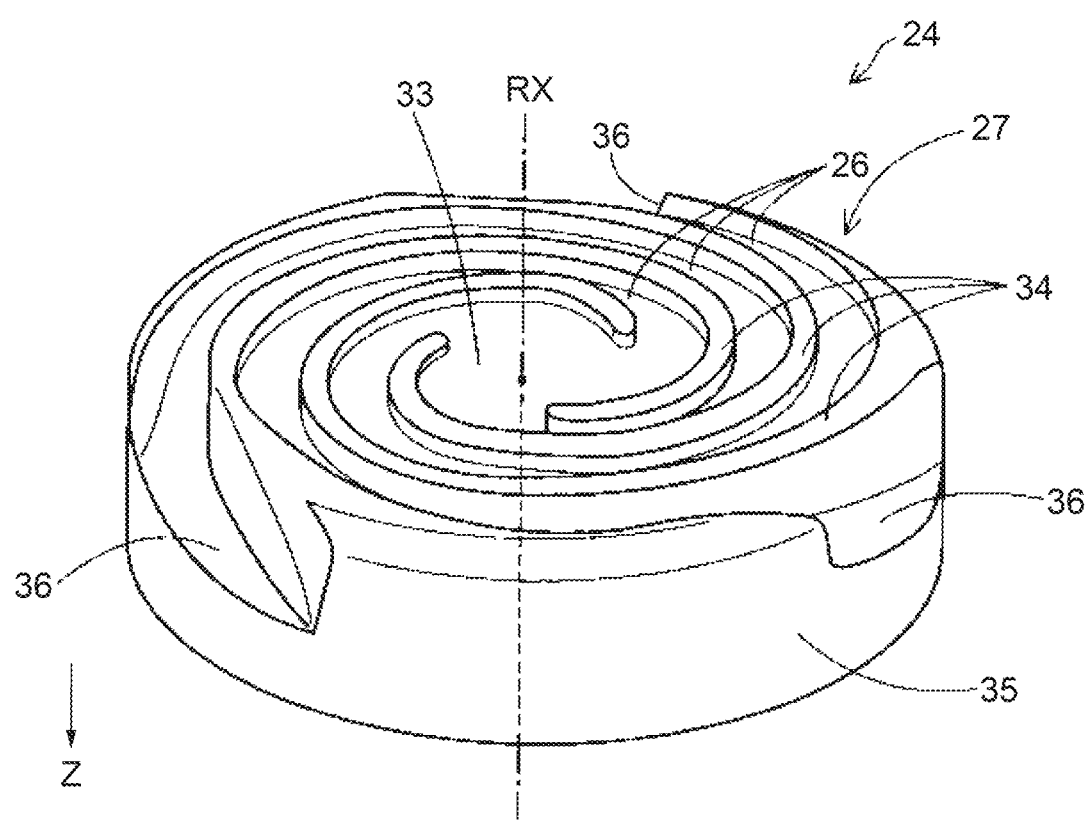
FIG. 2 is a perspective view showing a screw.

As shown in FIG. 2, the screw 24 has the groove forming surface 27. The screw grooves 26 are provided to the groove forming surface 27. A screw center portion 33 which is a center portion of the groove forming surface 27 of the screw 24 is configured as a recess to which one ends of the screw grooves 26 are connected. The screw center portion 33 is opposed to the communication hole 29 of the barrel 25 shown in FIG. 1. The screw center portion 33 crosses the central axis RX.

As shown in FIG. 2, the screw grooves 26 of the screw 24 each constitute a so-called scroll groove. The screw grooves 26 each extend spirally from the screw center portion 33 toward the outer periphery of the screw 24 drawing an arc. The screw grooves 26 may each be configured to extend in an involute curve shape or a spiral shape. The groove forming surface 27 is provided with protruding line portions 34. The protruding line portions 34 form sidewall portions of the screw grooves 26. The protruding line portions 34 extend along the screw grooves 26. The screw grooves 26 continue to material inlets 36 provided to a side surface 35 of the screw 24. The material inlets 36 are each a portion that receives the material supplied via the supply path 20 shown in FIG. 1.

FIG. 2 shows an example of the screw 24 having the three screw grooves 26 and the three protruding line portions 34. The number of the screw grooves 26 and the protruding line portions 34 provided to the screw 24 is not limited to three. The screw 24 may be provided with just one screw groove 26, or may be provided with two or more screw grooves 26. Further, any number of protruding line portions 34 may be provided in accordance with the number of the screw grooves 26.

FIG. 2 shows an example of the screw 24 in which the material inlets 36 are formed at three positions. The number of the material inlets 36 provided to the screw 24 is not limited to three. The screw 24 may be provided with the material inlet 36 at just one place, or may be provided with the material inlets 36 at two or more places.

Figure 3:
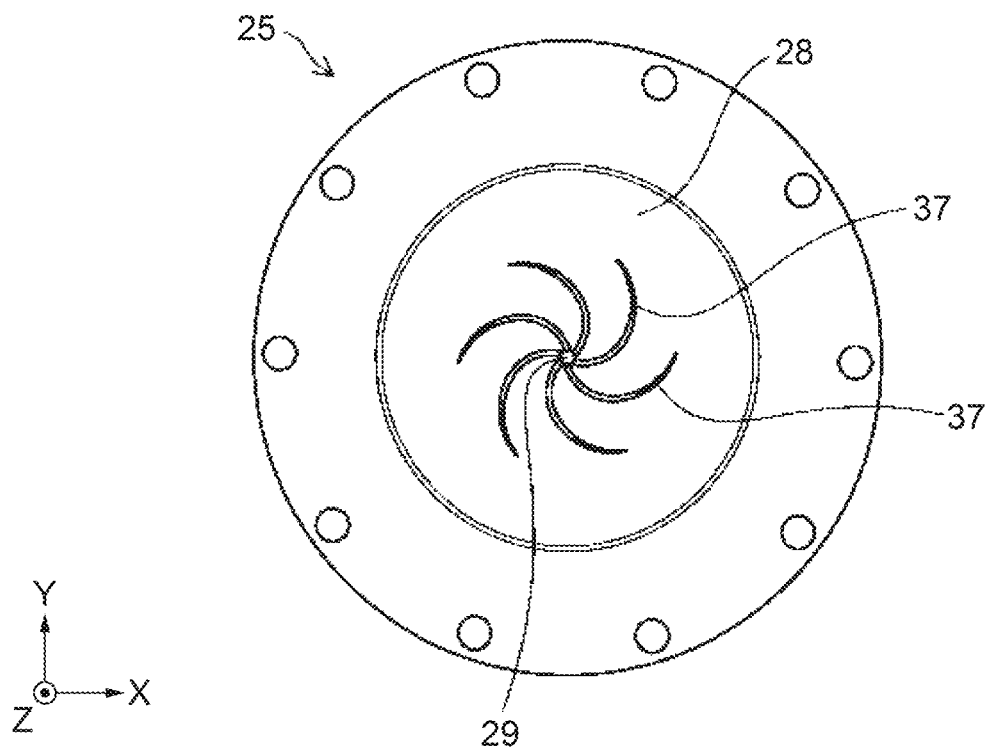
FIG. 3 is a plan view showing a barrel.

As shown in FIG. 3, the barrel 25 has the screw opposed surface 28. The communication hole 29 is formed at the center of the screw opposed surface 28. A plurality of guide grooves 37 are formed on the periphery of the communication hole 29 in the screw opposed surface 28. Each of the guide grooves 37 has one end coupled to the communication hole 29 and extends spirally from the communication hole 29 toward the outer periphery of the screw opposed surface 28. Each of the guide grooves 37 has a function of guiding the molding material to the communication hole 29. In order to make the molding material efficiently reach the communication hole 29, it is preferable to provide the guide grooves 37 to the barrel 25, but the guide groove 37 are not required to be formed.

The control unit 6 is formed of a computer including one or more processors, a main storage device, and an input and output interface for inputting and outputting signals from and to the outside. The control unit 6 exerts various functions by executing programs and commands read into the main storage device with the processor. For example, the control unit 6 exerts a function of executing three-dimensional molding processing. Note that the control unit 6 may be configured with a combination of a plurality of circuits instead of the computer.

The three-dimensional molding processing refers to processing for shaping a three-dimensional molding object. The three-dimensional molding processing may be referred to simply as shaping processing. In the three-dimensional molding processing, the control unit controls the plasticizing unit 17 and the moving mechanism unit 5 to discharge the molding material from the discharge unit 2 to the molding surface 11 to deposit the molding material on the molding surface 11. More specifically, the control unit 6 shapes a three-dimensional molding object by forming layers of the molding material while solidifying the molding material discharged onto the molding surface 11. The solidification of the molding material means that the molding material discharged from the discharge unit 2 loses fluidity. In the present embodiment, the molding material is thermally shrunk by being cooled, and loses fluidity to be solidified.

In the three-dimensional molding processing, the control unit 6 in the present embodiment shapes the three-dimensional molding object in accordance with molding data. For example, the control unit 6 generates the molding data by dividing the three-dimensional molding object on the shape data representing the shape of the three-dimensional molding object created using three-dimensional CAD software or three-dimensional CG software into layers having a predetermined thickness. In this case, the control unit 6 can acquire the shape data from, for example, an external computer coupled to the three-dimensional molding apparatus 1. Further, for example, the control unit 6 may directly acquire the molding data from an external computer or the like without generating the molding data. Further, for example, the molding data may be generated by slicer software or the like.

Figure 4:
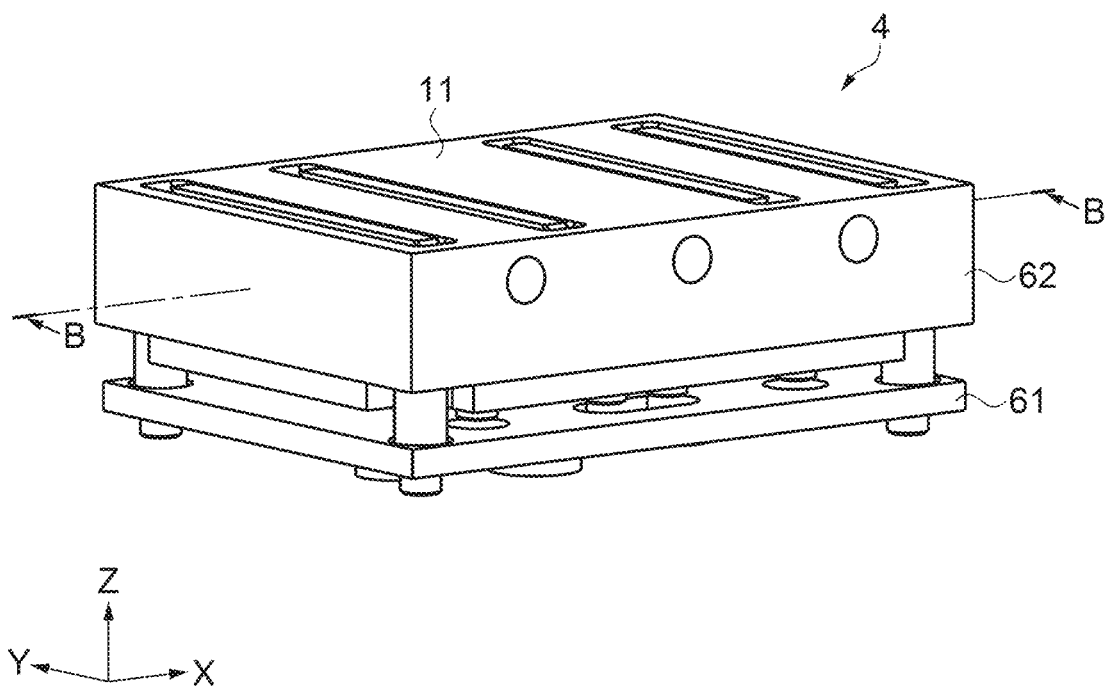
FIG. 4 is a perspective view showing a molding stage.
Figure 5:
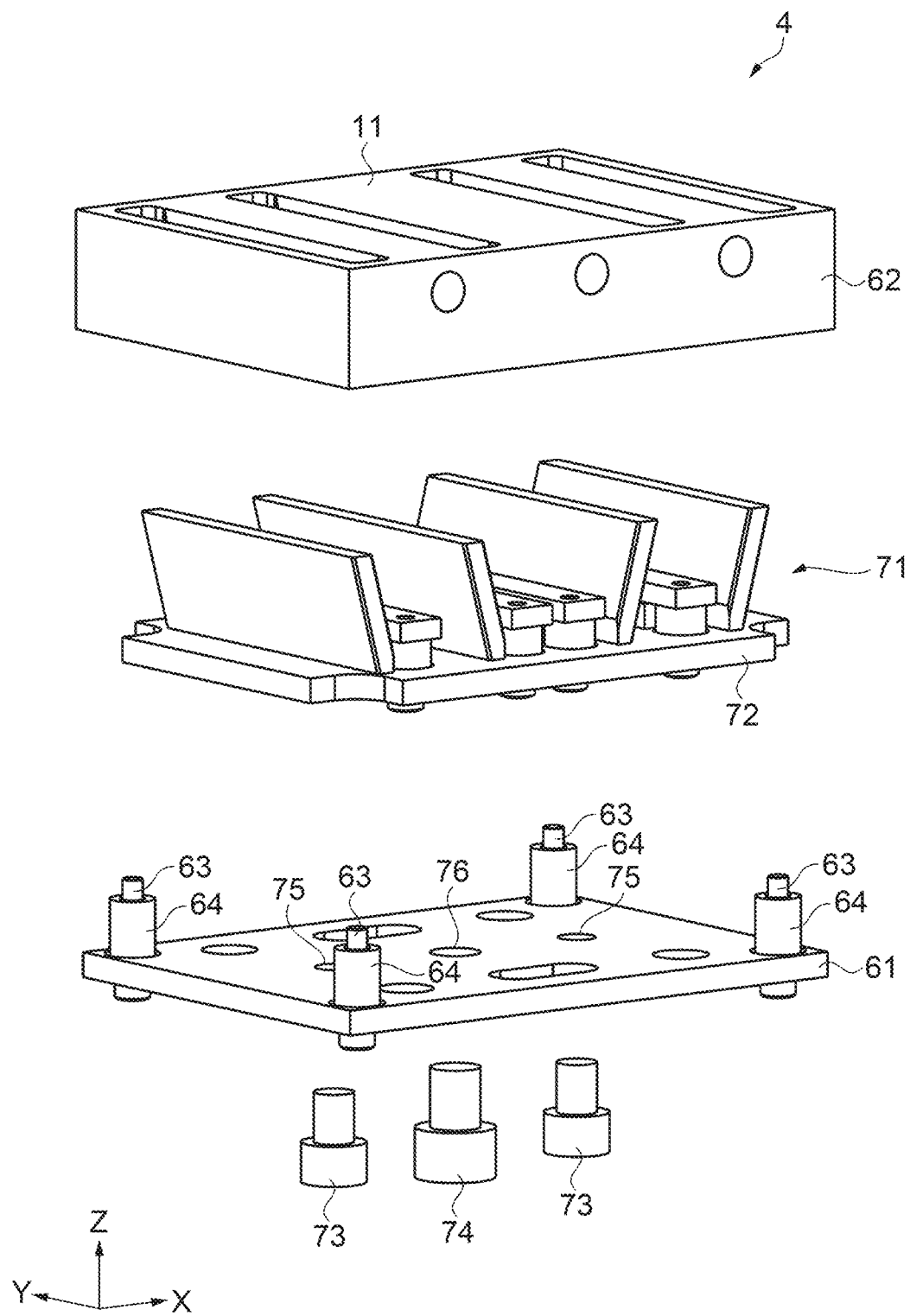
FIG. 5 is an exploded perspective view showing the molding stage.

As shown in FIG. 4, the molding stage 4 includes a support plate 61 and a molding plate 62. The support plate 61 supports the molding plate 62. The molding plate 62 is located at the +Z direction side of the support plate 61. A gap is formed between the support plate 61 and the molding plate 62. The molding plate 62 is an example of a base. As shown in FIG. 5, the support plate 61 and the molding plate 62 are fixed to each other with bolts 63. A spacer 64 is interposed between the support plate 61 and the molding plate 62. The support plate 61 and the molding plate 62 are fixed to each other with the bolts 63 with the spacer 64 interposed therebetween. Accordingly, a gap is formed between the support plate 61 and the molding plate 62.

As shown in FIG. 5, the molding stage 4 further includes a slide unit 71. The slide unit 71 is located between the support plate 61 and the molding plate 62. The slide unit 71 is located at the +Z direction side of the support plate 61. The slide unit 71 includes a slide plate 72. The slide plate 72 is supported by the support plate 61. The molding stage 4 further includes two support bolts 73 and a grip bolt 74. The two support bolts 73 and the grip bolt 74 are located at the −Z direction side of the support plate 61. The support plate 61 is provided with two screw holes 75. The two screw holes 75 penetrate the support plate 61 along the Z axis.

The two support bolts 73 protrude toward the +Z direction side of the support plate 61 from the −Z direction side of the support plate 61 in a state of being respectively engaged with the two screw holes 75. The two support bolts 73 are in contact with the slide plate 72 in a state of protruding toward the +Z direction side of the support plate 61. By adjusting the protrusion amounts of the two support bolts 73 from the support plate 61, a height position of the slide plate 72 along the Z axis with respect to the support plate 61 can be changed. That is, by adjusting the protruding amounts of the two support bolts 73 from the support plate 61, a height position of the slide unit 71 along the Z axis with respect to the support plate 61 can be changed.

Further, an insertion hole 76 is provided to the support plate 61. The grip bolt 74 protrudes toward the +Z direction side of the support plate 61 in a state of being inserted into the insertion hole 76 from the −Z direction side of the support plate 61. A gap is formed between the grip bolt 74 and the insertion hole 76. The slide plate 72 is provided with a screw hole to be engaged with a thread of the grip bolt 74. The grip bolt 74 engages with the screw hole of the slide plate 72 in a state of protruding toward the +Z direction side of the support plate 61. An operator can raise and lower the slide unit 71 along the Z axis with respect to the support plate 61 by raising and lowering the grip bolt 74 with respect to the support plate 61.

Figure 6:
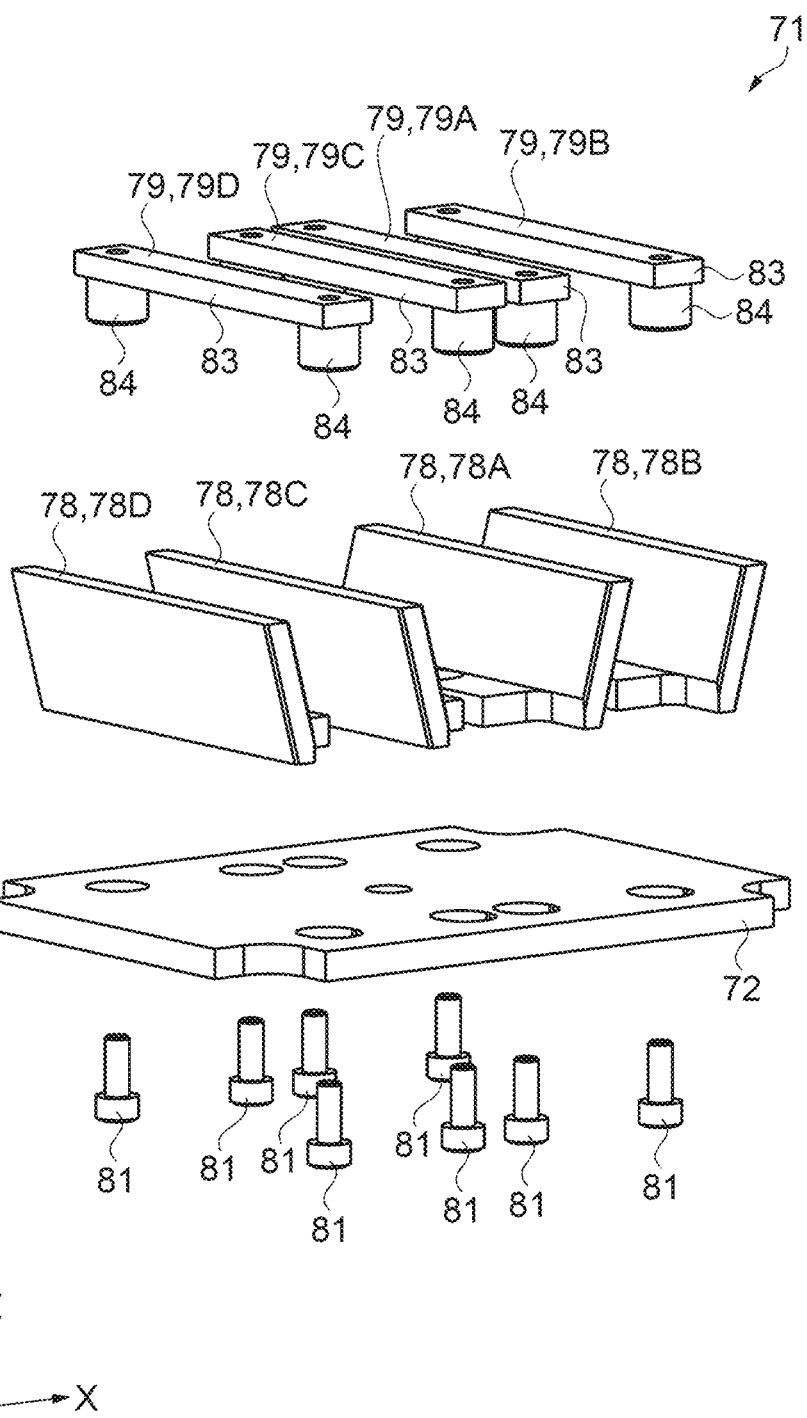
FIG. 6 is an exploded perspective view showing a slide unit.

As shown in FIG. 6, the slide unit 71 further includes a plurality of stoppers 78, a plurality of stopper holding members 79, and a plurality of bolts 81. In the present embodiment, the slide unit 71 includes four stoppers 78, four stopper holding members 79, and eight bolts 81. When the four stoppers 78 are individually identified, the four stoppers 78 are denoted by a stopper 78A, a stopper 78B, a stopper 78C, and a stopper 78D, respectively. When the four stopper holding members 79 are individually identified, the four stopper holding members 79 are respectively denoted by a stopper holding member 79A, a stopper holding member 79B, a stopper holding member 79C, and a stopper holding member 79D. The four stoppers 78 are located at the +Z direction side of the slide plate 72. The four stoppers 78 are placed on the slide plate 72. The four stopper holding members 79 are located at the +Z direction side of the slide plate 72. Each of the four stopper holding members 79 includes a holding part 83 and two leg parts 84.

Figure 7:
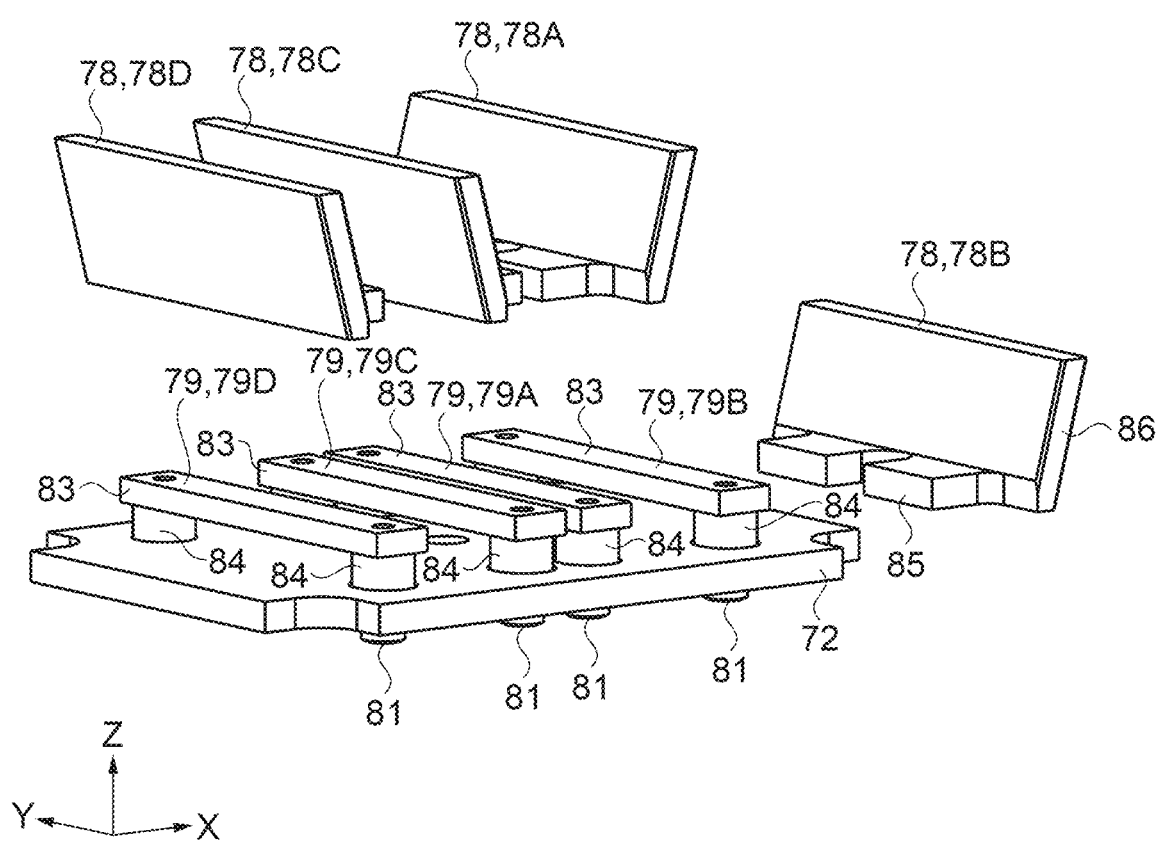
FIG. 7 is an exploded perspective view showing the slide unit.

As shown in FIG. 7, the two leg parts 84 are fixed with the bolts 81 from the −Z direction side of the slide plate 72 in a state of being placed on the slide plate 72. The holding part 83 is located at the +Z direction side of the two leg parts 84. The holding part 83 extends between the two leg parts 84. A gap is formed between the holding part 83 and the slide plate 72. The stoppers 78 each include a base portion 85 and a stop portion 86. The base portion 85 is a portion placed on the slide plate 72. The stop portion 86 extends from the base portion 85 in the +Z direction. The stop portion 86 is inclined with respect to the Z axis when viewed in the +Y direction. The base portion 85 is inserted between the slide plate 72 and the holding part 83. In a state where the base portion 85 is inserted between the slide plate 72 and the holding part 83, a gap is formed between the base portion 85 and the holding part 83.

Figure 8:
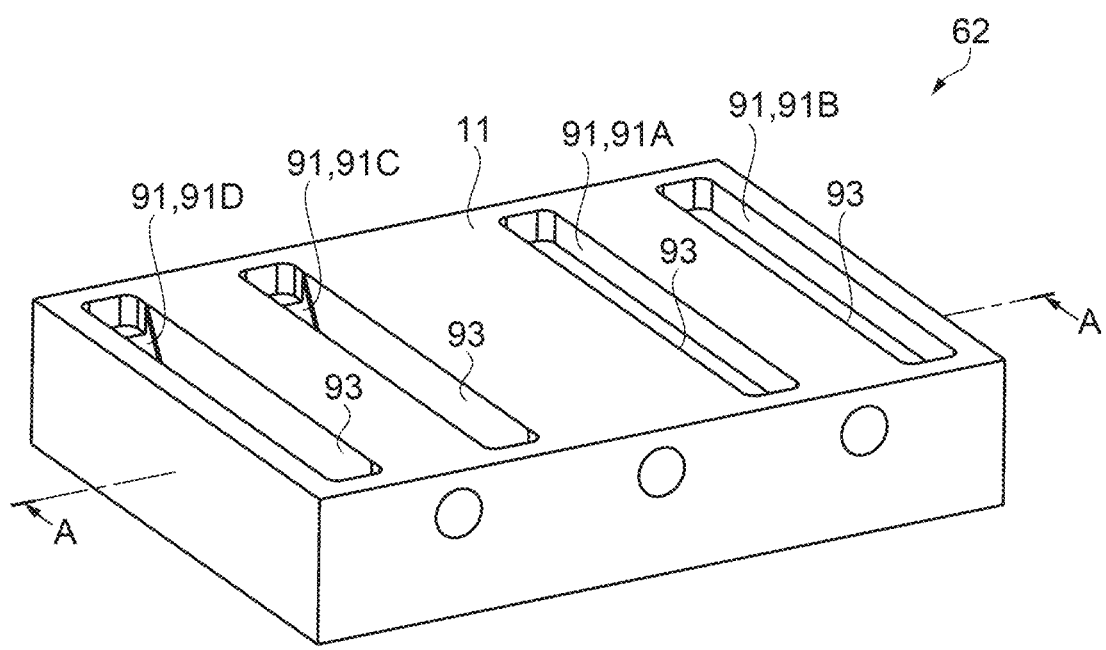
FIG. 8 is a perspective view showing a molding plate.

As shown in FIG. 8, the molding plate 62 has the molding surface 11. The molding surface 11 faces to the +Z direction. A plurality of grooves 91 are provided to the molding surface 11. Each of the plurality of grooves 91 is formed in a direction recessed from the molding surface 11 toward the −Z direction. In the present embodiment, four grooves 91 are provided to the molding surface 11. The number of the grooves 91 is not limited to four, and any number can be adopted as long as the number is two or more. When the four grooves 91 are individually identified, the four grooves 91 are denoted by a groove 91A, a groove 91B, a groove 91C, and a groove 91D, respectively. Each of the four grooves 91 extends along the Y axis in a plan view. The four grooves 91 are arranged along the X axis.

Figure 9:
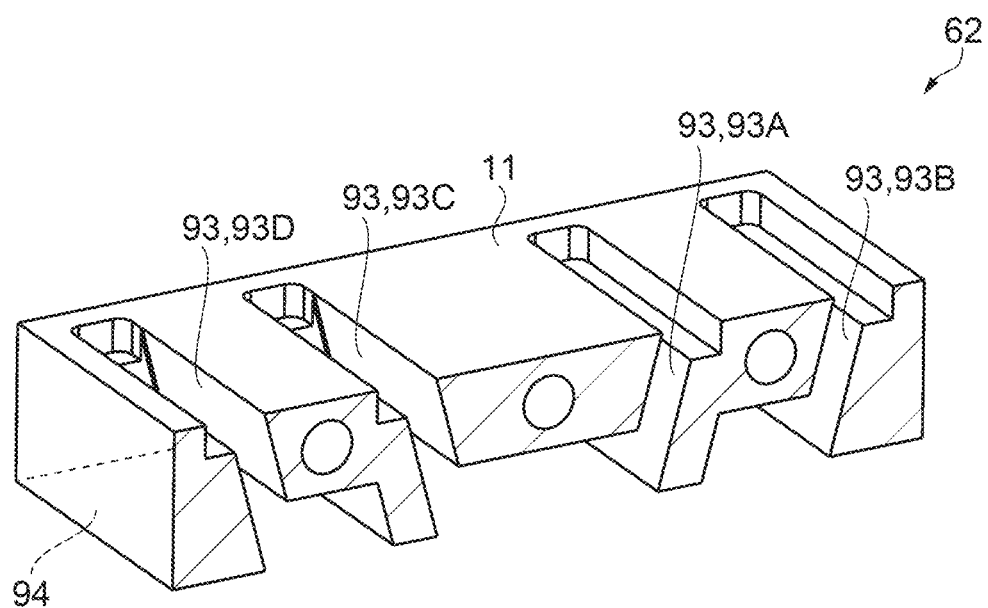
FIG. 9 is a perspective view of the molding plate when being cut along the line A-A in FIG. 8.

FIG. 9 is a perspective view of the molding plate 62 when being cut along the line A-A in FIG. 8. As shown in FIG. 9, a plurality of through holes 93 are provided to the molding plate 62. Each of the four through holes 93 penetrates between the molding surface 11 and a reverse surface 94 to the molding surface 11. In the present embodiment, four through holes 93 are provided to the molding plate 62. The number of the through holes 93 is not limited to four, and any number can be adopted as long as the number is two or more. When the four through holes 93 are individually identified, the four through holes 93 are respectively denoted by a through hole 93A, a through hole 93B, a through hole 93C, and a through hole 93D.

Figure 10:
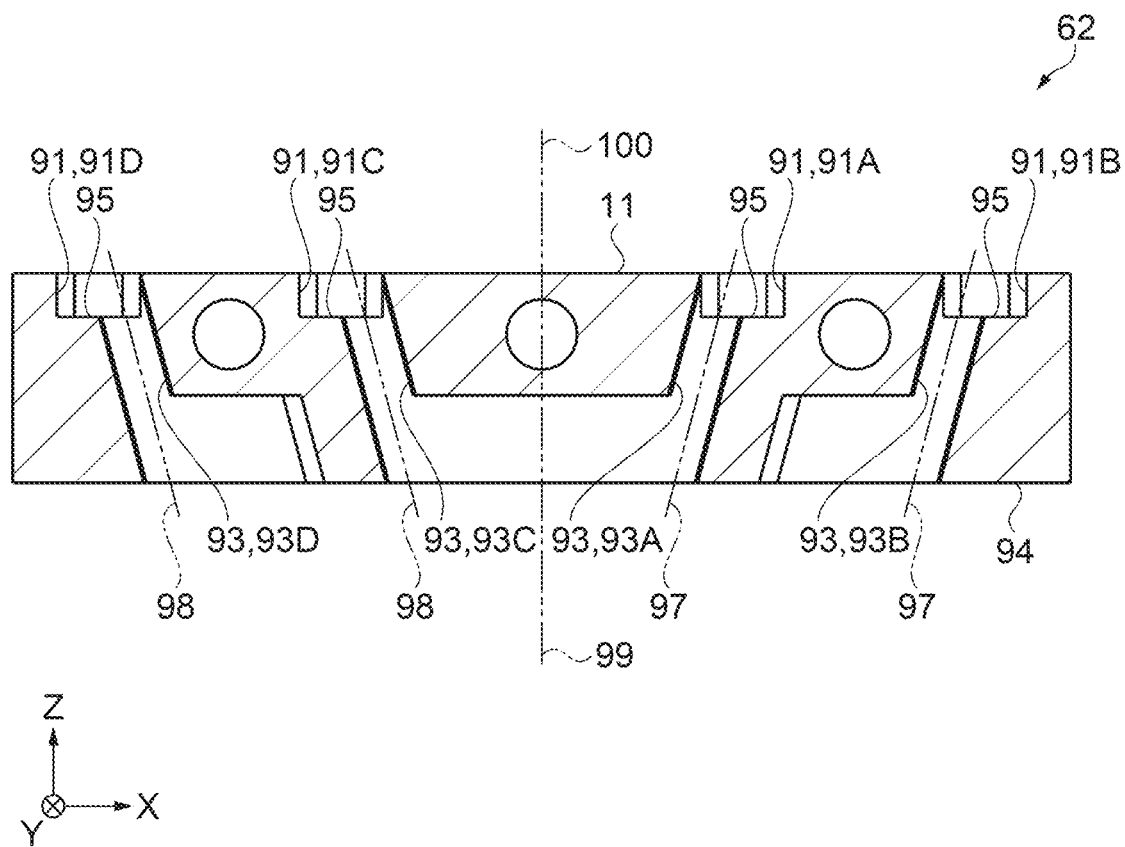
FIG. 10 is a cross-sectional view along the line A-A in FIG. 8.

FIG. 10 is a cross-sectional view along the line A-A in FIG. 8. As shown in FIG. 10, each of the four through holes 93 is communicated with an inside of the groove 91. The through hole 93 opens in the molding surface 11 in a state of being communicated with a bottom 95 of the groove 91. In other words, the through hole 93 penetrates from the bottom 95 of the groove 91 to the reverse surface 94. Out of the four through holes 93, the through hole 93A and the through hole 93B each penetrate the molding plate 62 along a first intersecting axis 97. Out of the four through holes 93, the through hole 93C and the through hole 93D each penetrate the molding plate 62 along a second intersecting axis 98. The first intersecting axis 97 and the second intersecting axis 98 cross a vertical axis 99. The vertical axis 99 is an axis perpendicular to the molding surface 11.

Each of the four through holes 93 is inclined with respect to the vertical axis 99. The first intersecting axis 97 and the second intersecting axis 98 cross each other. Each of the first intersecting axis 97 and the second intersecting axis 98 is inclined in a direction of getting closer to a central axis 100 passing through the center of the molding surface 11 among the vertical axes 99 as proceeding from the molding surface 11 toward the reverse surface 94. At least one of the through hole 93A and the through hole 93B is an example of a first through hole. At least one of the through hole 93C and the through hole 93D is an example of a second through hole. The central axis 100 passes through the center of the molding surface 11 in a plan view of the molding surface 11. The through hole 93A and the through hole 93C are located at positions symmetric about the central axis 100. The through hole 93B and the through hole 93D are located at positions symmetric about the central axis 100.

Figure 11:
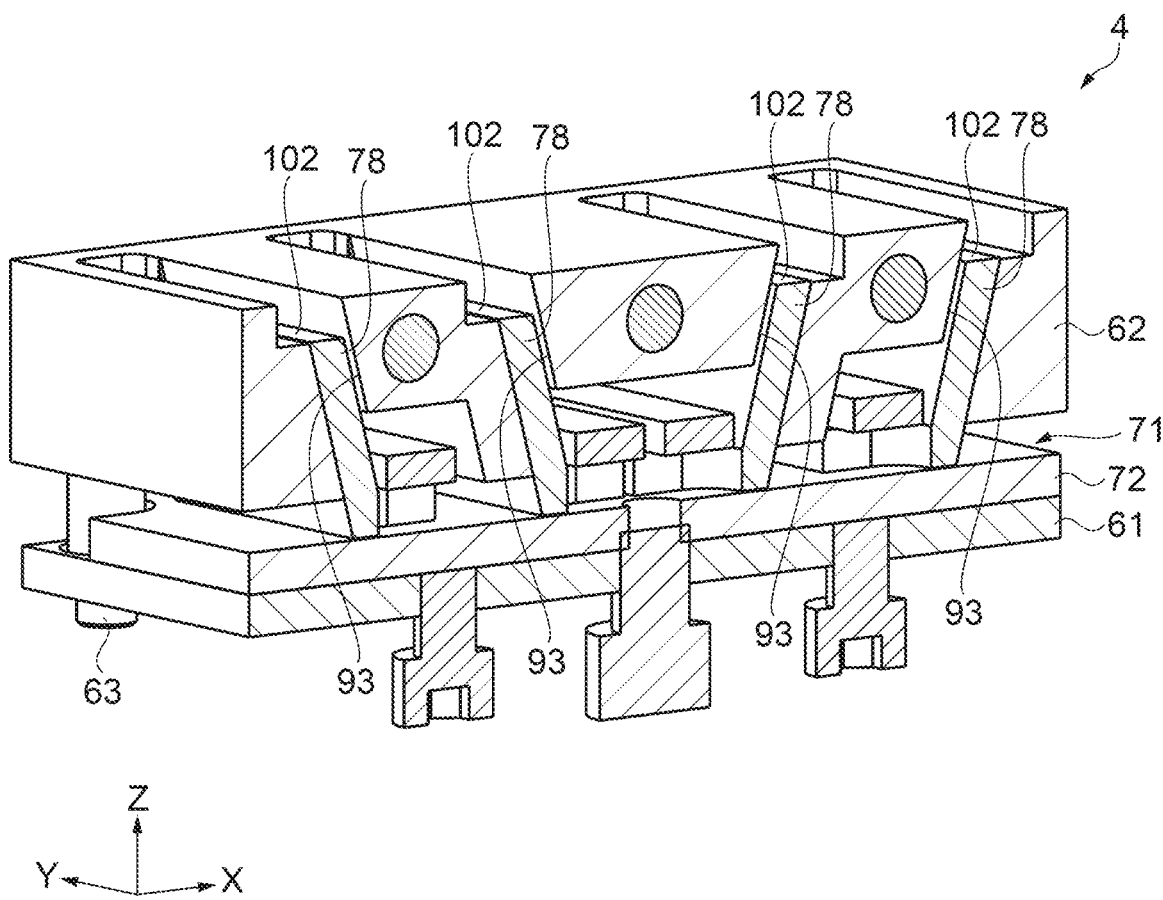
FIG. 11 is a perspective view of the molding stage when being cut along the line B-B in FIG. 4.

FIG. 11 is a perspective view of the molding stage 4 when being cut along the line B-B in FIG. 4. As shown in FIG. 11, in the molding stage 4, the slide unit 71 is interposed between the support plate 61 and the molding plate 62. The support plate 61 and the molding plate 62 are fixed to each other with the bolts 63 in a state in which the slide unit 71 is interposed therebetween. In a state where the slide plate 72 is in contact with the support plate 61, each of the plurality of stoppers 78 is housed in the through hole 93. The position of the stopper 78 when a tip portion 102 of the stopper 78 is housed in the through hole 93 is referred to as a housed position. The tip portion 102 is an end portion at the +Z direction side of the stopper 78.

Figure 12:
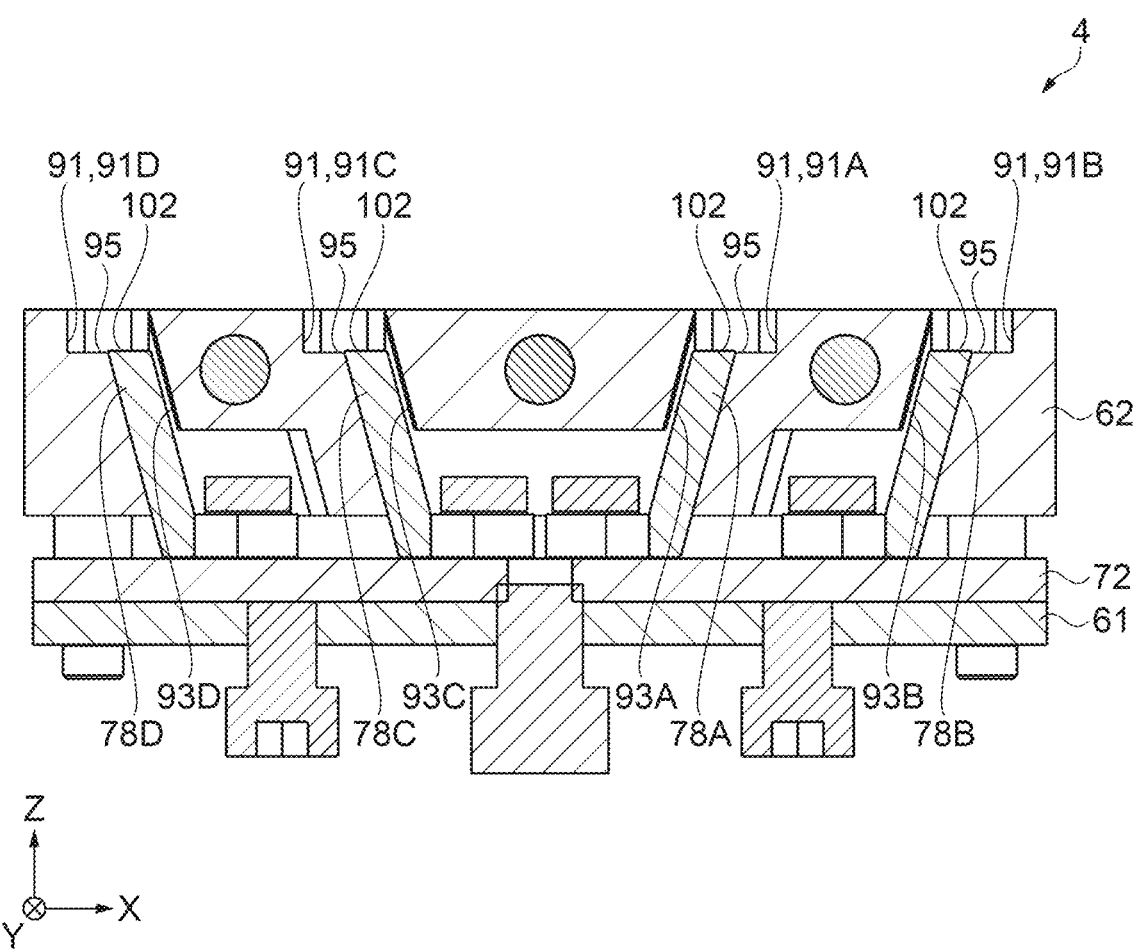
FIG. 12 is a cross-sectional view along the line B-B in FIG. 4.

FIG. 12 is a cross-sectional view along line B-B in FIG. 4. As shown in FIG. 12, in the present embodiment, the tip portion 102 of the stopper 78 does not protrude from the bottom 95 of the groove 91 at the housed position. The stoppers 78 are retracted into the inside of the molding plate 62 from the bottom 95 of the groove 91 at the housed position. The state where the tip portion 102 does not protrude from the bottom 95 of the groove 91 includes a state where the tip portion 102 is at the same height as the bottom 95 of the groove 91 and a state where the tip portion 102 is lower than the bottom 95 of the groove 91. The stopper 78 to be inserted into the through hole 93A is the stopper 78A. The stopper 78 to be inserted into the through hole 93B is the stopper 78B. The stopper 78 to be inserted into the through hole 93C is the stopper 78C. The stopper 78 to be inserted into the through hole 93D is the stopper 78D.

At least one of the stoppers 78A and 78B is an example of a first slide member. At least one of the stoppers 78C and 78D is an example of a second slide member. The housed positions of the stoppers 78A and 78B are first housed positions. The housed positions of the stoppers 78C and 78D are second housed positions. At least one of the groove 91A and the groove 91B is an example of a first recess. At least one of the groove 91C and the groove 91D is an example of a second recess.

Figure 13:
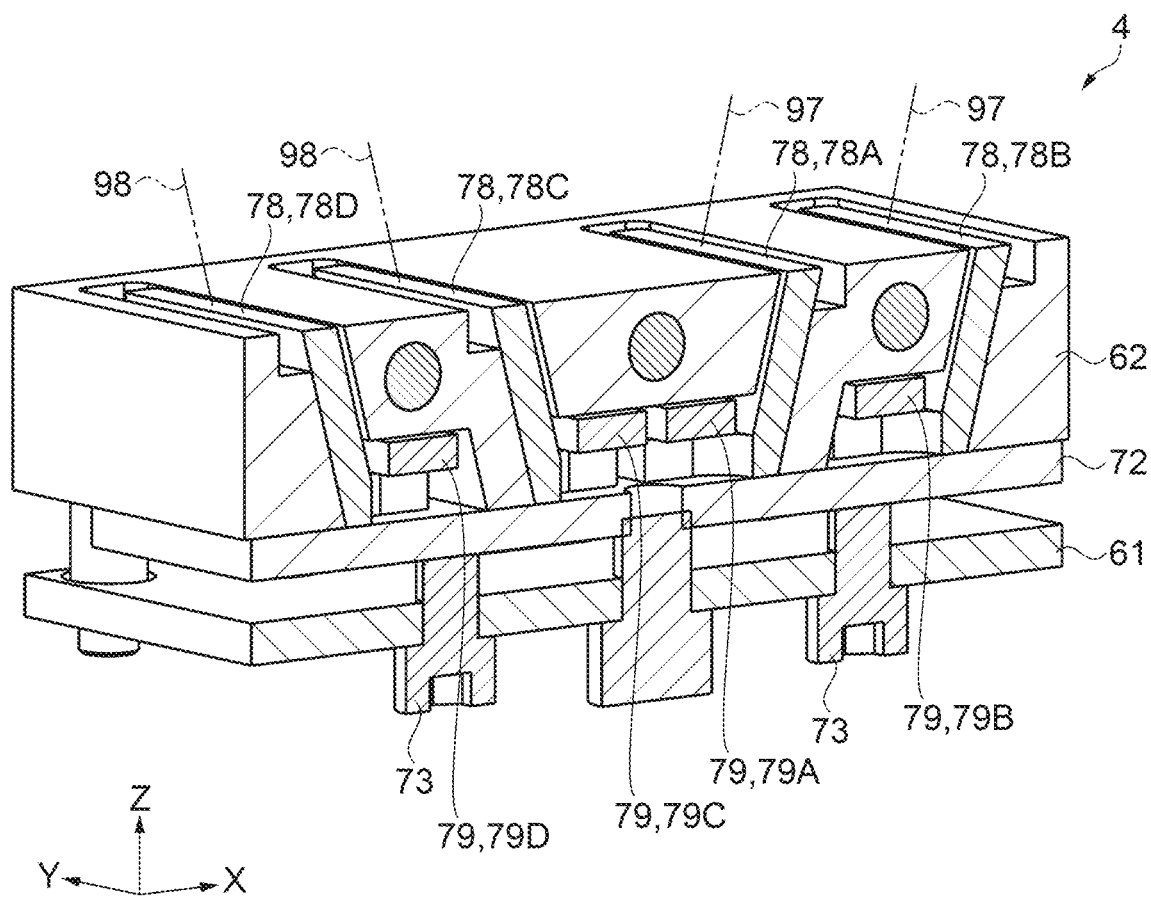
FIG. 13 is a perspective view of the molding stage when being cut along the line B-B in FIG. 4.

FIG. 13 is a perspective view of the molding stage 4 when being cut along the line B-B in FIG. 4. As shown in FIG. 13, the slide unit 71 can be raised toward the +Z direction by protruding the two support bolts 73 from the support plate 61. At this time, a gap is formed between the slide plate 72 and the support plate 61. The stoppers 78A and 78B can slide along the first intersecting axis 97 as the slide unit 71 rises. The stoppers 78C and 78D can slide along the second intersecting axis 98 as the slide unit 71 rises.

Figure 14:
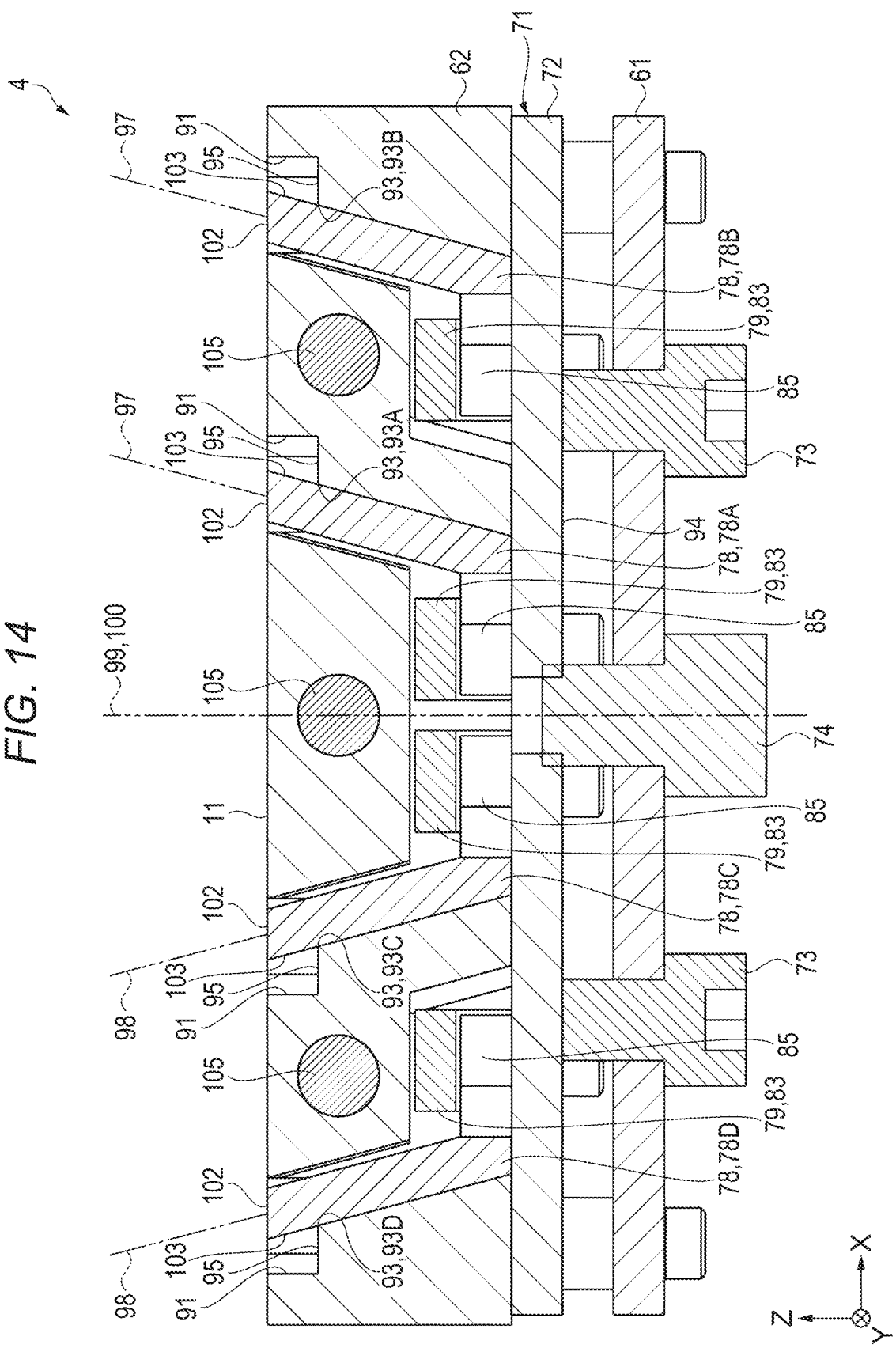
FIG. 14 is a cross-sectional view along the line B-B in FIG. 4.

FIG. 14 is a cross-sectional view along line B-B in FIG. 4. As shown in FIG. 14, in a state where a gap is formed between the slide plate 72 and the support plate 61, the plurality of stoppers 78 respectively protrude from the through holes 93. The positions of the stoppers 78 when the tip portions 102 protrude from the through holes 93 are referred to as protruding positions. In the present embodiment, at the protruding position, the tip portion 102 protrudes from the through hole 93 into the groove 91. At the protruding position, the tip portion 102 protrudes from the bottom 95 of the groove 91. When the tip portion 102 protrudes from the bottom 95 of the groove 91, a sidewall 103 of the stopper 78 protrudes in a direction of narrowing the opening of the groove 91. The protruding positions of the stoppers 78A and 78B are first protruding positions. The protruding positions of the stoppers 78C and 78D are second protruding positions.

The three-dimensional molding apparatus 1 having the configuration described above is capable of shaping the molding object on the molding surface 11 of the molding stage 4 by discharging the molding material from the nozzle hole 31 shown in FIG. 1 toward the molding stage 4. At this time, in the three-dimensional molding apparatus 1, it is possible to shape the molding objects having various three-dimensional shapes by changing the relative positions between the discharge unit 2 and the molding stage 4 while discharging the molding material from the nozzle hole 31.

In the present embodiment, there is applied a method of discharging the molding material from the nozzle hole 31 toward the molding stage 4 in a state where the slide unit 71 shown in FIG. 14 is raised. By raising the slide unit 71, the sidewall 103 of the stopper 78 projects in a direction of narrowing the opening of the groove 91. The molding material discharged from the nozzle hole 31 to the molding surface 11 of the molding stage 4 enters the plurality of grooves 91. When the molding material that has entered the plurality of grooves 91 is solidified, the position of the solidified portion along the Z axis is regulated by the sidewall 103 of the stopper 78 protruding into the groove 91. Therefore, it is possible to prevent the molding object formed on the molding stage 4 from moving toward the +Z direction.

According to the molding stage 4, the through hole 93A and the through hole 93C penetrate the molding plate 62 along the first intersecting axis 97 and the second intersecting axis 98 crossing each other, respectively. Therefore, the stopper 78A and the stopper 78C slide along the first intersecting axis 97 and the second intersecting axis 98 crossing each other, respectively. When the molding material is deposited in a state where the stopper 78A protrudes from the through hole 93A and the stopper 78C protrudes from the through hole 93C, the molding object can be fixed with the stopper 78A and the stopper 78C inclined in respective directions different from each other. Accordingly, the molding object can be fixed more strongly compared to when the stopper 78A and the stopper 78C are inclined in the same direction.

Further, according to the molding stage 4, the through hole 93B and the through hole 93D penetrate the molding plate 62 along the first intersecting axis 97 and the second intersecting axis 98 crossing each other, respectively. Therefore, the stopper 78B and the stopper 78D slide along the first intersecting axis 97 and the second intersecting axis 98 crossing each other, respectively. When the molding material is deposited in a state where the stopper 78B protrudes from the through hole 93B and the stopper 78D protrudes from the through hole 93D, the molding object can be fixed by the stopper 78B and the stopper 78D inclined in respective directions different from each other. Accordingly, the molding object can be fixed more strongly compared to when the stopper 78B and the stopper 78D are inclined in the same direction.

Further, in the molding stage 4, each of the first intersecting axis 97 and the second intersecting axis 98 is inclined in a direction of getting closer to the central axis 100 passing through the center of the molding surface 11 among the vertical axes 99 as proceeding from the molding surface 11 toward the reverse surface 94. According to the molding stage 4, when the molding material contracts toward the center of the molding surface 11 in the plan view, it is possible to apply the fixing force in a direction adverse to the contraction of the molding material.

In the three-dimensional molding apparatus 1, when a first layer of the molding material is applied to the molding surface 11 with the nozzle 18, it is preferable to apply the first layer while changing the position of the nozzle 18 with respect to the molding stage 4 along the X axis in the plan view. Further, at this time, it is preferable to apply the first layer while changing the position of the nozzle 18 with respect to the molding stage 4 along the X axis across the through hole 93A and the through hole 93C. According to the three-dimensional molding method, when the molding material is applied to the molding surface 11, it is possible to apply the molding material discharged from the nozzle 18 across the through hole 93A and the through hole 93C. Accordingly, the first layer serving as the base of the molding object can be fixed with the stopper 78A and the stopper 78C inclined in the respective directions different from each other.

Note that it is possible to adopt a method of heating the molding plate 62 when the first layer of the molding material is applied to the molding surface 11 with the nozzle 18. The method of heating the molding plate 62 can be achieved by a heater 105 shown in FIG. 14. In the present embodiment, the heater 105 is disposed between the two through holes 93 adjacent to each other along the X axis in the plan view. By heating the molding plate 62 with the heater 105, the fluidity of the molding material is easily maintained. When the first layer of the molding material is applied to the molding surface 11 with the nozzle 18, the fluidity of the molding material is easily maintained, and therefore, it is possible to make it easy to sufficiently fill the inside of the groove 91 with the molding material. Therefore, it is easy to more stably fix the molding object to the molding stage 4.

Note that changing the position of the nozzle 18 with respect to the molding stage 4 along the X axis can be achieved by moving the nozzle 18. The changing the position of the nozzle 18 with respect to the molding stage 4 along the X axis can also be achieved by moving the molding stage 4. Furthermore, changing the position of the nozzle 18 with respect to the molding stage 4 along the X axis can also be achieved by moving both the nozzle 18 and the molding stage 4.

Figure 15:
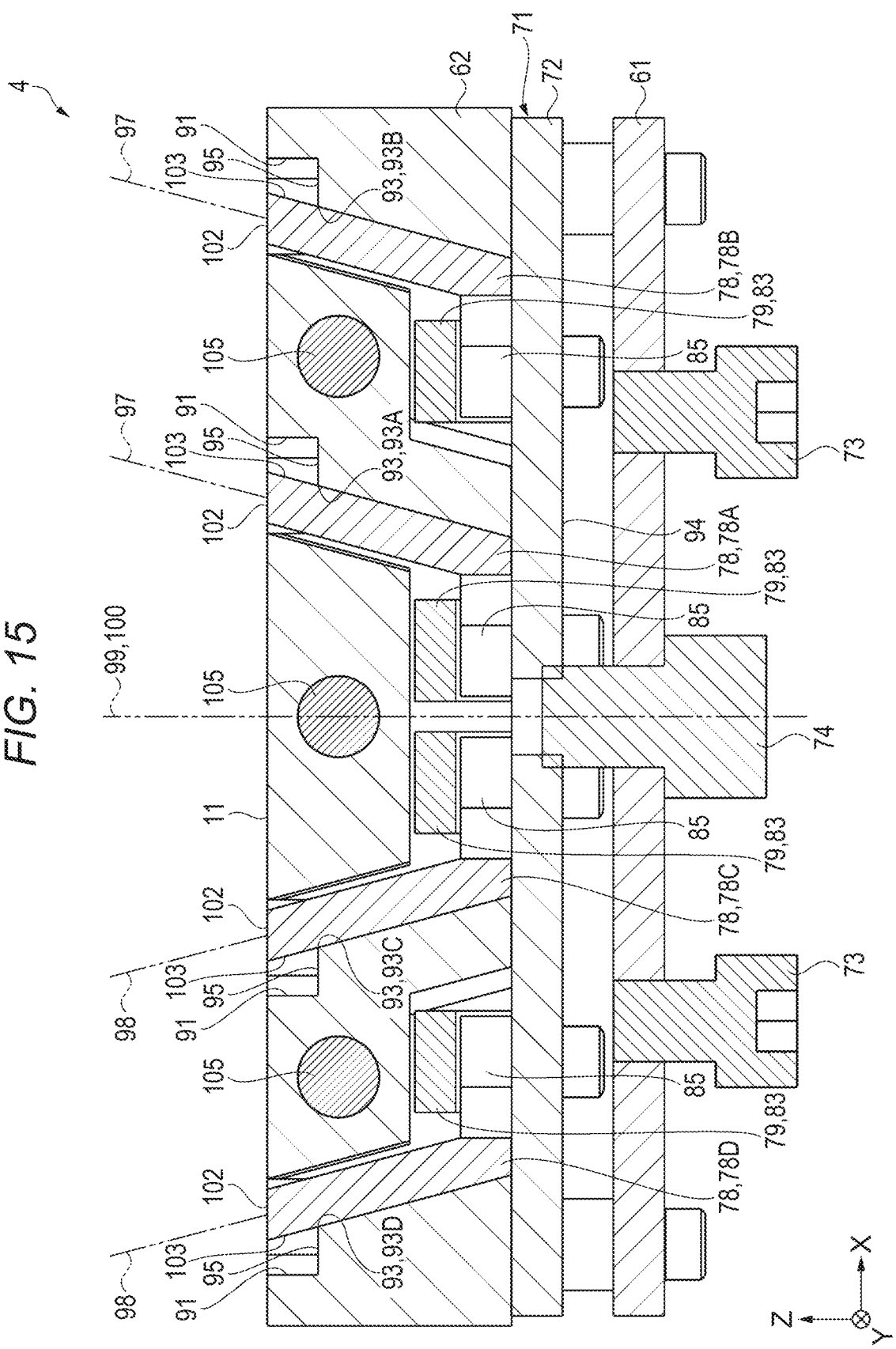
FIG. 15 is a cross-sectional view along the line B-B in FIG. 4.

By lowering the slide unit 71 with respect to the molding plate 62 after the application of the molding material with the nozzle 18 is completed, the molding material can easily be separated from the molding stage 4. In order to lower the slide unit 71 with respect to the molding plate 62, first, the operator houses the two support bolts 73 in the support plate 61 as shown in FIG. 15. Housing the support bolt 73 in the support plate 61 includes aligning the position of the end portion at the +Z direction side of the support bolt 73 with the position of surface at the +Z direction side of the support plate 61. Housing the support bolt 73 in the support plate 61 also includes embedding the end portion at the +Z direction side of the support bolt 73 in the support plate 61. Further, housing the support bolt 73 in the support plate 61 also includes removing the support bolt 73 from the support plate 61.

By housing the two support bolts 73 in the support plate 61, a gap is formed between the support plate 61 and the slide plate 72. Here, the fact that there is a gap between the support plate 61 and the slide plate 72 means that between the support plate 61 and the slide plate 72, there is no object that inhibits mutual contact. Even when the two support bolts 73 are housed in the support plate 61, the gap between the support plate 61 and the slide plate 72 is maintained by the molding material which fills the grooves 91. That is, even when the two support bolts 73 are housed in the support plate 61, the slide unit 71 does not descend by its own weight.

After the two support bolts 73 are housed in the support plate 61, the operator can lower the slide unit 71 by pulling the grip bolt 74 toward the −Z direction. The grip bolt 74 is fastened to the slide plate 72. Therefore, the slide plate 72 is lowered by pulling the grip bolt 74 toward the −Z direction. The stopper holding members 79 are fixed to the slide plate 72. Therefore, as the slide plate 72 descends, the stopper holding members 79 also descend. Further, at this time, the stoppers 78 are lowered by the base portions 85 being pulled by the stopper holding members 79.

As described above, in the slide unit 71, there is a gap between the base portion 85 and the holding part 83. The stopper 78 has a degree of freedom of displacement along the X axis as much as the gap between the base portion 85 and the holding part 83. Therefore, the stopper 78A and the stopper 78B are each configured to be able to slide along the first intersecting axis 97 as the slide plate 72 moves up and down. Similarly, the stoppers 78C and 78D are each configured to be able to slide along the second intersecting axis 98 as the slide plate 72 moves up and down.

The slide plate 72 is an example of a support member. At least one of the stopper holding member 79A and the stopper holding member 79B is an example of a first coupling member. At least one of the stopper holding members 79C and 79D is an example of a second coupling member. According to the molding stage 4, the stoppers 78A and 78C can be raised and lowered together by raising and lowering the slide plate 72 with respect to the molding plate 62. According to the molding stage 4, the stoppers 78B and 78D can be raised and lowered together by raising and lowering the slide plate 72 with respect to the molding plate 62.

The arrangement of the grooves 91 and the through holes 93 is not limited to the example shown in FIG. 8. As the arrangement of the grooves 91 and the through holes 93, various arrangements such as a radial shape and a concentric circular shape in the plan view can be adopted. Further, the shape of the through holes 93 is not limited to a quadrilateral configured with straight lines in the plan view. The shape of the through holes 93 may be a shape including a curve in the plan view.

In the present embodiment, the grooves 91 are provided to the molding surface 11. However, it is also possible to adopt the molding plate 62 in which the grooves 91 are omitted. In the molding stage 4 including the molding plate 62 in which the grooves 91 are omitted, the tip portions 102 of the stoppers 78 protrude from the molding surface 11 at the protruding positions. Further, in the molding stage 4 including the molding plate 62 in which the grooves 91 are omitted, the tip portions 102 of the stoppers 78 do not protrude from the molding surface 11 at the housed positions. That is, in the molding stage 4 including the molding plate 62 in which the grooves 91 are omitted, the plurality of stoppers 78 are housed in the through holes 93 at the housed positions. The stoppers 78 are retracted to the inside of the molding plate 62 from the molding surface 11 at the housed positions. The state in which the tip portion 102 does not protrude from the molding surface 11 includes a state in which the tip portion 102 is at the same height as the molding surface 11 and a state in which the tip portion 102 is lower than the molding surface 11.

Figure 16:
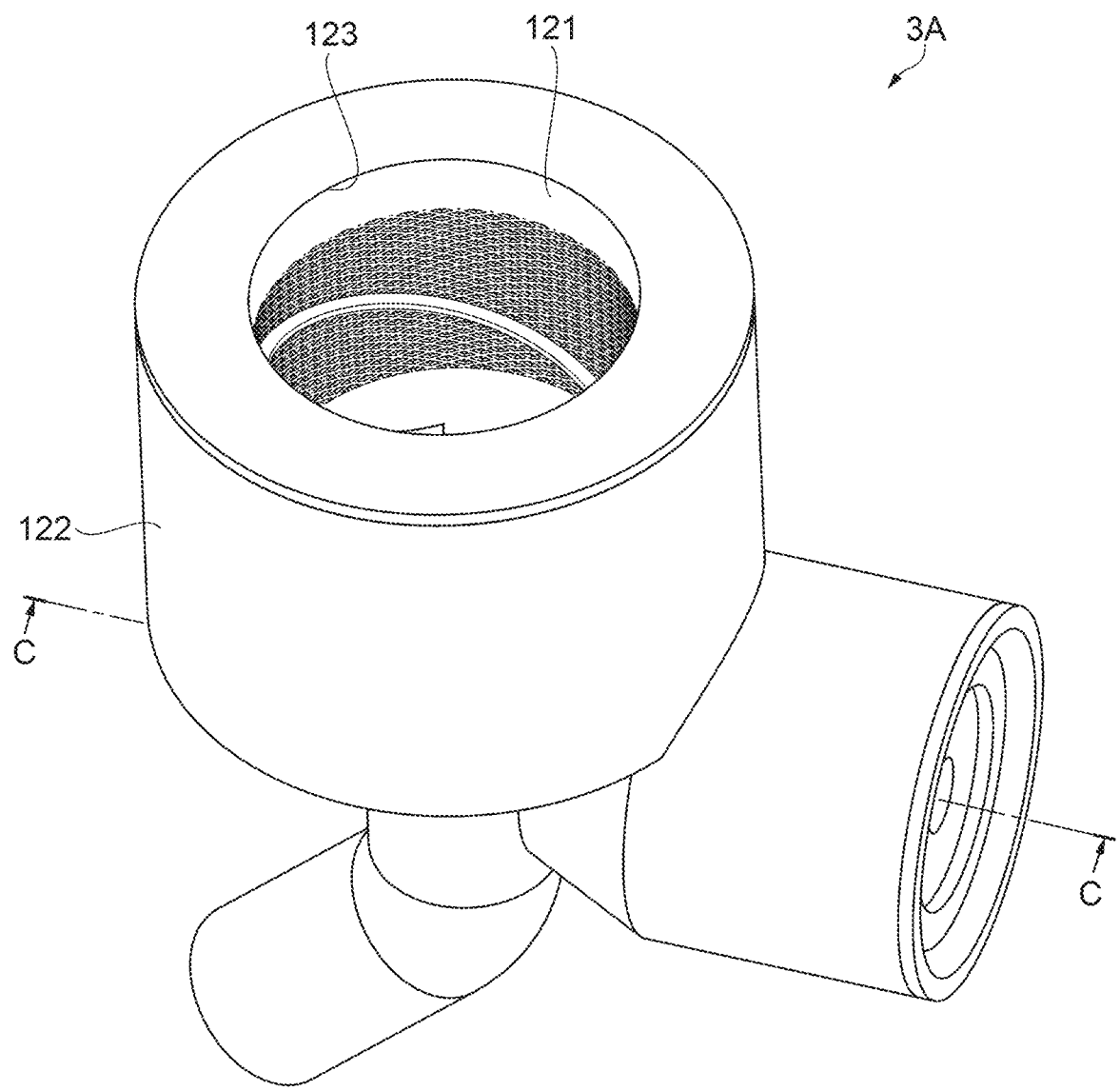
FIG. 16 is a perspective view showing a supply device in Example 1.

As shown in FIG. 16, a supply device 3A, which is an example of the supply device 3, includes a material cage 121 and a case 122. The supply device 3A is Example 1 of the supply device 3. The material cage 121 houses the granular materials 19 described above. The material cage 121 has an input port 123. The granular material 19 is put into the material cage 121 from the input port 123. In the supply device 3A, the granular material 19 housed in the material cage 121 can be discharged little by little from the input port 123. The supply device 3A is a device that supplies the granular material 19 from the input port 123 to the supply path 20 shown in FIG. 1 little by little.

Figure 17:
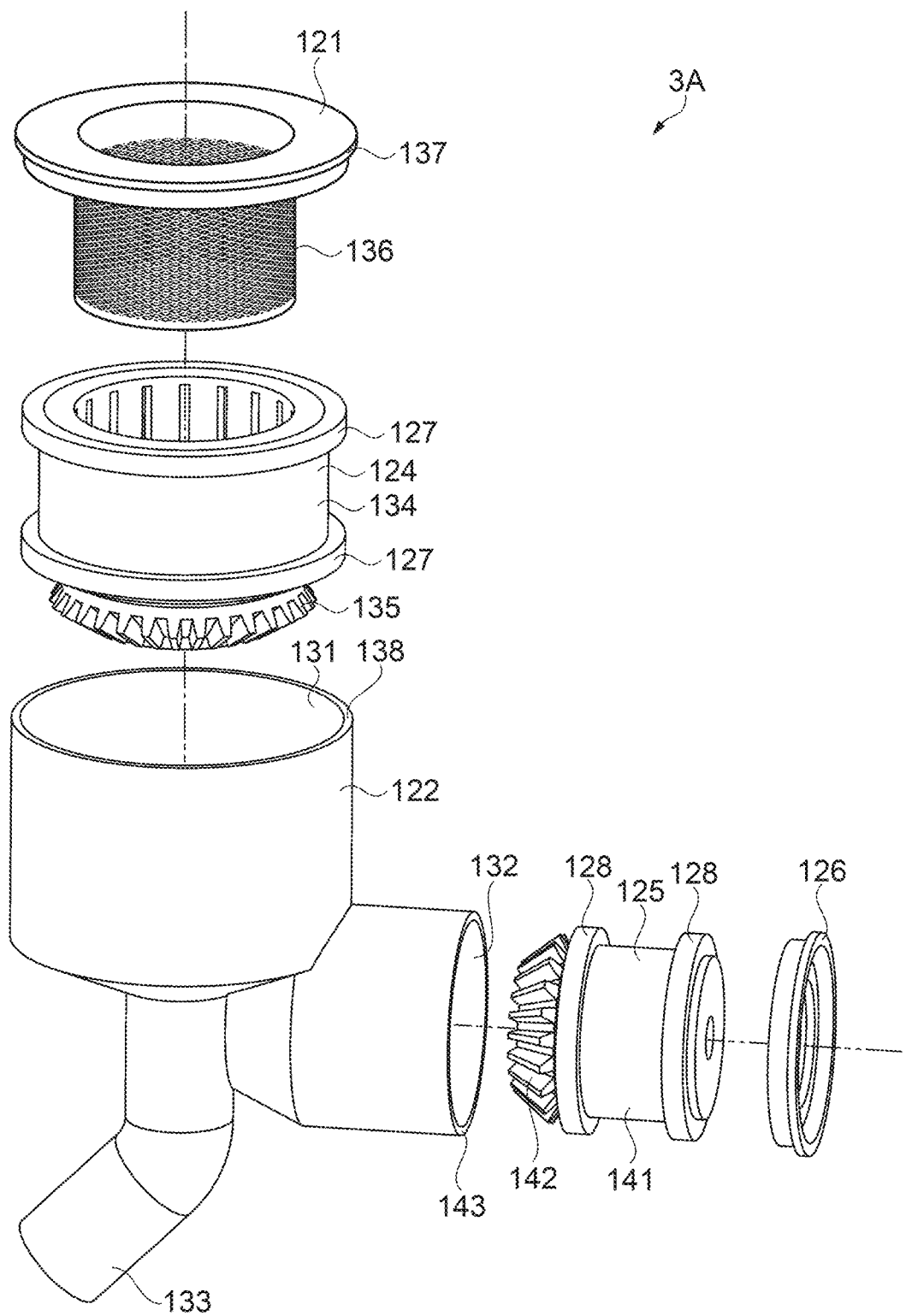
FIG. 17 is an exploded perspective view showing the supply device in Example 1.

As shown in FIG. 17, the supply device 3A further includes a suction cage 124, a drive gear 125, and a fixing member 126. Further, the supply device 3A further includes two bearings 127 and two bearings 128. The case 122 includes a first housing unit 131, a second housing unit 132, and a suction tube 133. The first housing unit 131 houses the suction cage 124. The suction cage 124 includes a cylindrical trunk portion 134 and a gear 135. The material cage 121 is housed in the trunk portion 134 of the suction cage 124. The gear 135 is disposed at an opposite side of the trunk portion 134 to the material cage 121. In each of the two bearings 127, there is inserted the outer circumference of the trunk portion 134 of the suction cage 124. The suction cage 124 is rotatable around the central axis of the trunk portion 134 with respect to the case 122 with the two bearings 127 in a state of being housed in the first housing unit 131 of the case 122.

The material cage 121 includes a cage portion 136 and a flange portion 137. The cage portion 136 is housed in the trunk portion 134 of the suction cage 124. The flange portion 137 is located at the opposite side of the cage portion 136 to the suction cage 124. The flange portion 137 protrudes outward from the outer circumference of the cage portion 136. In a state where the cage portion 136 is housed in the trunk portion 134 of the suction cage 124, the flange portion 137 projects outward from the outer circumference of the suction cage 124. In a state where the suction cage 124 is housed in the first housing unit 131 of the case 122 and the cage portion 136 of the material cage 121 is housed in the suction cage 124, the flange portion 137 is fixed to an edge portion 138 of the case 122. Therefore, when the suction cage 124 rotates in the first housing unit 131 of the case 122, the material cage 121 does not rotate. In other words, the suction cage 124 is rotatable with respect to the material cage 121 in a state of being housed in the first housing unit 131 of the case 122. The suction cage 124 is an example of a cylindrical body.

The drive gear 125 includes a cylindrical shape trunk portion 141 and a gear 142. The drive gear 125 is housed in the second housing unit 132 of the case 122. The fixing member 126 is fixed to an edge portion 143 of the case 122 in a state where the drive gear 125 is housed in the second housing unit 132. The fixing member 126 prevents the drive gear 125 housed in the second housing unit 132 from falling off from the second housing unit 132. The gear 142 is provided at an opposite side to the fixing member 126 side of the trunk portion 141. In each of the two bearings 128, there is inserted the outer circumference of the trunk portion 141. The drive gear 125 is rotatable with respect to the case 122 with the two bearings 128 in a state of being housed in the second housing unit 132 of the case 122.

Figure 18:
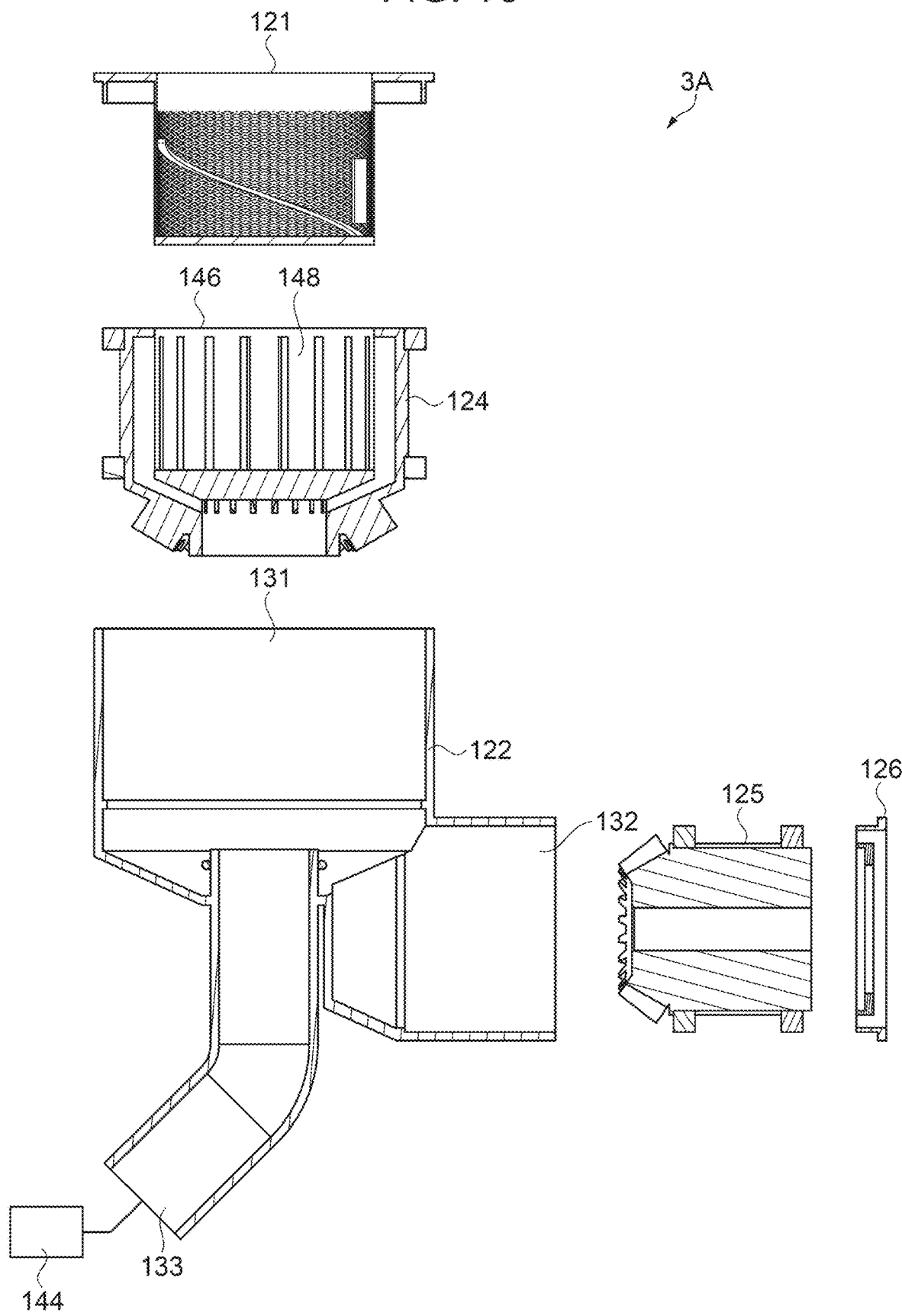
FIG. 18 is an exploded cross-sectional view along the line C-C in FIG. 16.

FIG. 18 is an exploded cross-sectional view along the line C-C in FIG. 16. As shown in FIG. 18, the suction tube 133 communicates with the first housing unit 131. A suction pump 144 is coupled to an opposite side of the suction tube 133 to the first housing unit 131 side. By driving the suction pump 144, a gas located in the suction tube 133 is sucked. When the gas located in the suction tube 133 is sucked, the gas located in the first housing unit 131 communicated with the suction tube 133 is also sucked. That is, the gas located in the first housing unit 131 is sucked by driving the suction pump 144.

Figure 19:
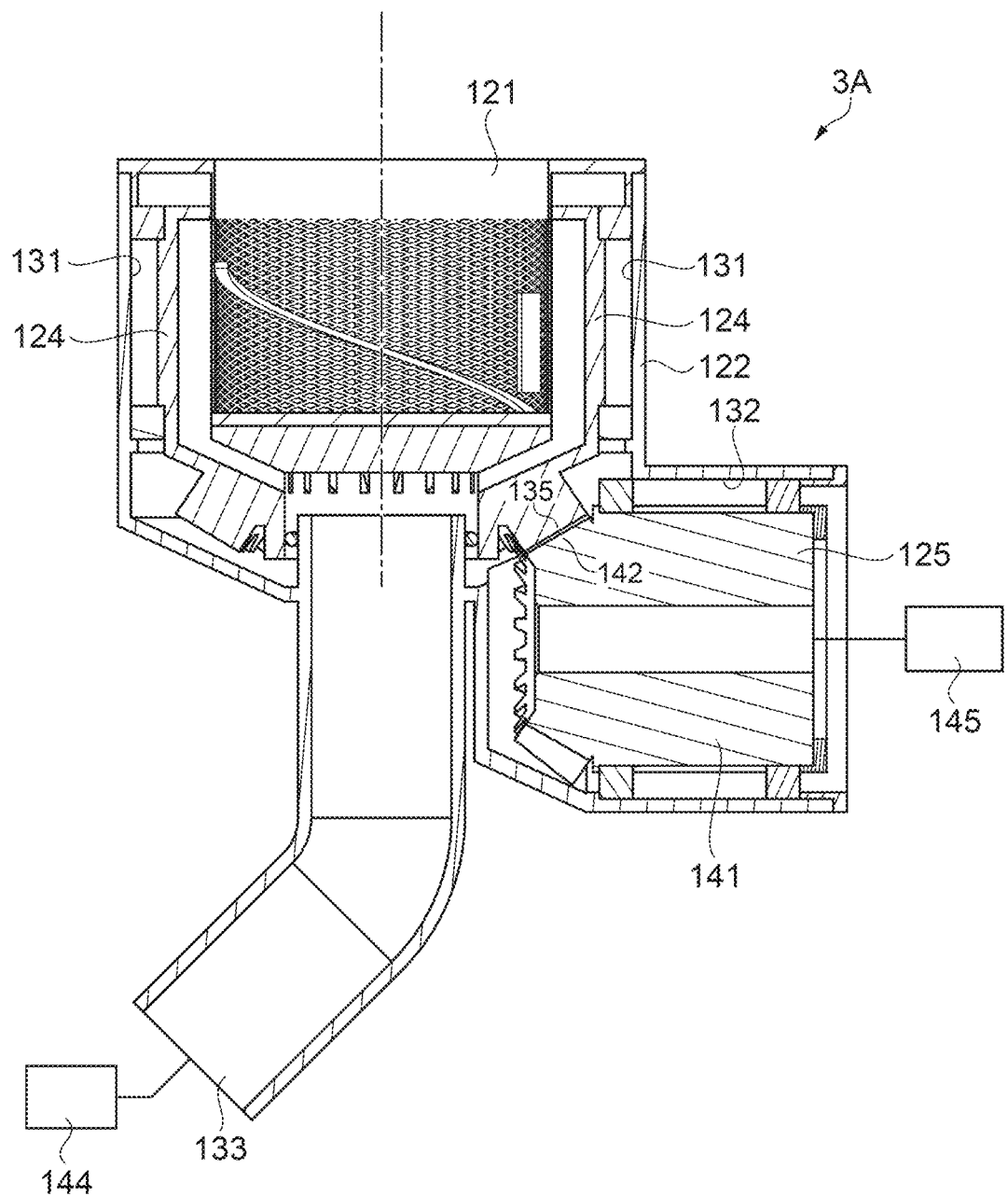
FIG. 19 is a cross-sectional view along the line C-C in FIG. 16.

FIG. 19 is a cross-sectional view along the line C-C in FIG. 16. As shown in FIG. 19, the gear 135 and the gear 142 mesh with each other in a state where the suction cage 124 is housed in the first housing unit 131 of the case 122 and the drive gear 125 is housed in the second housing unit 132 of the case 122. Note that the gear 135 and the gear 142 are each a bevel gear. A drive motor 145 is coupled to the trunk portion 141 of the drive gear 125. The drive gear 125 is rotationally driven with the power from the drive motor 145. When the drive gear 125 is driven to rotate with the power from the drive motor 145, the suction cage 124 is driven to rotate around the central axis via the gear 135.

Figure 20:
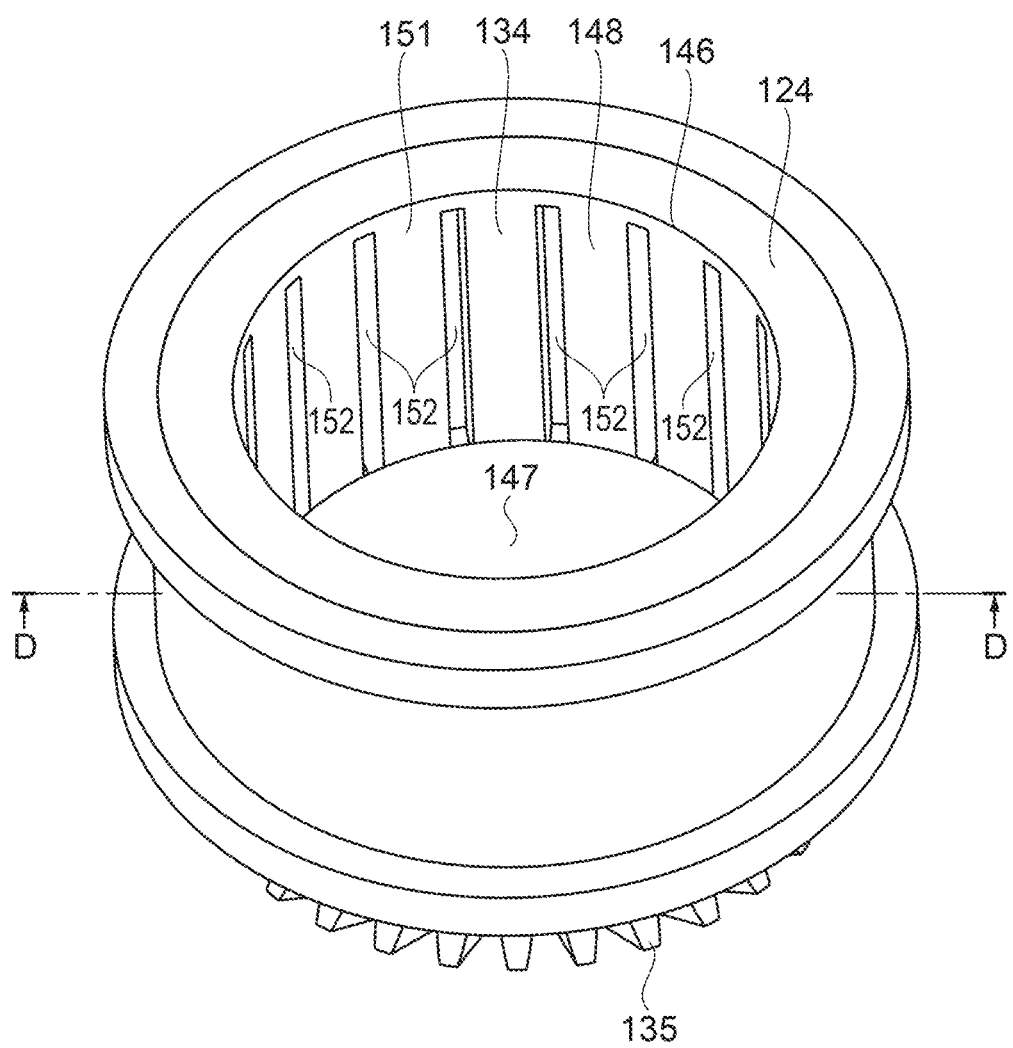
FIG. 20 is a perspective view showing a suction cage.

As shown in FIG. 20, the suction cage 124 has an opening portion 146 and a bottom portion 147. The bottom portion 147 is provided to the trunk portion 134. The bottom portion 147 is the bottom of the trunk portion 134. The bottom portion 147 is located at the gear 135 side of the trunk portion 134. The opening portion 146 is a portion that opens at the opposite side to the bottom portion 147 side of the trunk portion 134. The trunk portion 134 having a cylindrical shape and the bottom portion 147 constitute a housing unit 148 for housing the material cage 121 shown in FIG. 18. The material cage 121 is inserted into the trunk portion 134 through the opening portion 146. As shown in FIG. 20, a plurality of suction grooves 152 are provided to an inner side surface 151 of the trunk portion 134. Each of the plurality of suction grooves 152 extends in a direction from the bottom portion 147 toward the opening portion 146. The plurality of suction grooves 152 are arranged in a circumferential direction of the trunk portion 134 on the side surface 151.

Figure 21:
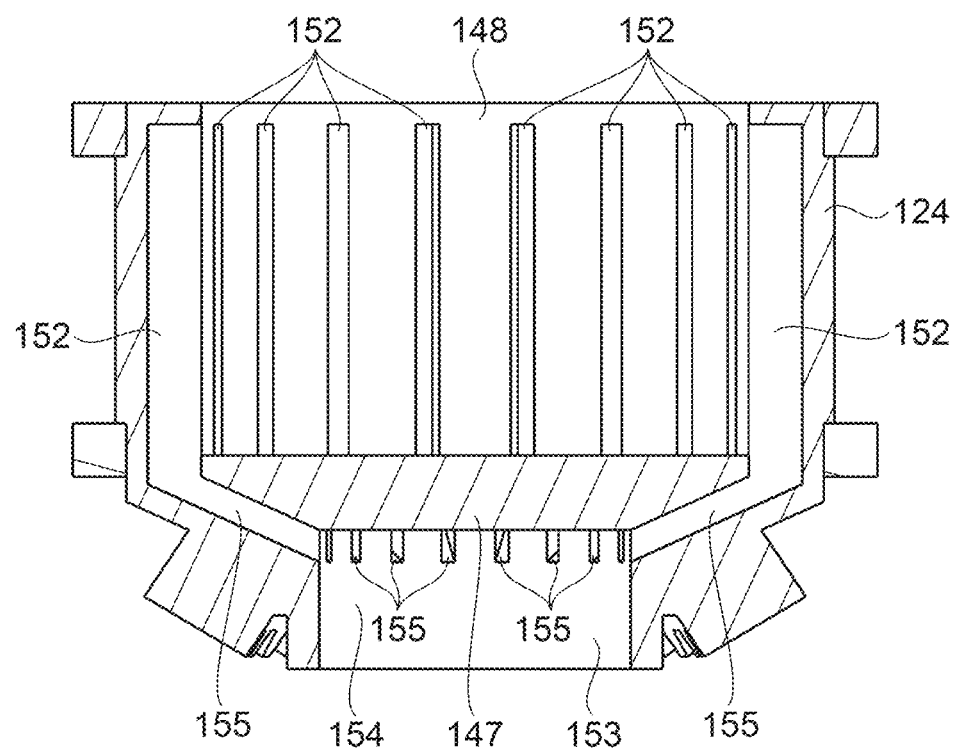
FIG. 21 is a cross-sectional view along the line D-D in FIG. 20.

As shown in FIG. 21, the suction cage 124 is provided with a suction port 153. The suction port 153 is a region to be coupled to the suction tube 133 of the case 122 shown in FIG. 19. As shown in FIG. 21, the suction port 153 extends up to the bottom portion 147. The suction port 153 and the housing unit 148 are separated from each other by the bottom portion 147. A plurality of suction holes 155 are provided to an inner wall 154 of the suction port 153. The plurality of suction holes 155 penetrate the bottom portion 147 from the inner wall 154 of the suction port 153 and communicates with the respective suction grooves 152. The suction holes 155 and the suction grooves 152 communicate the suction port 153 and the housing unit 148 with each other. By driving the suction pump 144 shown in FIG. 19, the gas located in the housing unit 148 is sucked from the suction tube 133 via the suction port 153, the suction holes 155, and the suction grooves 152 shown in FIG. 21. The suction pump 144 is an example of a suction device.

Figure 22:
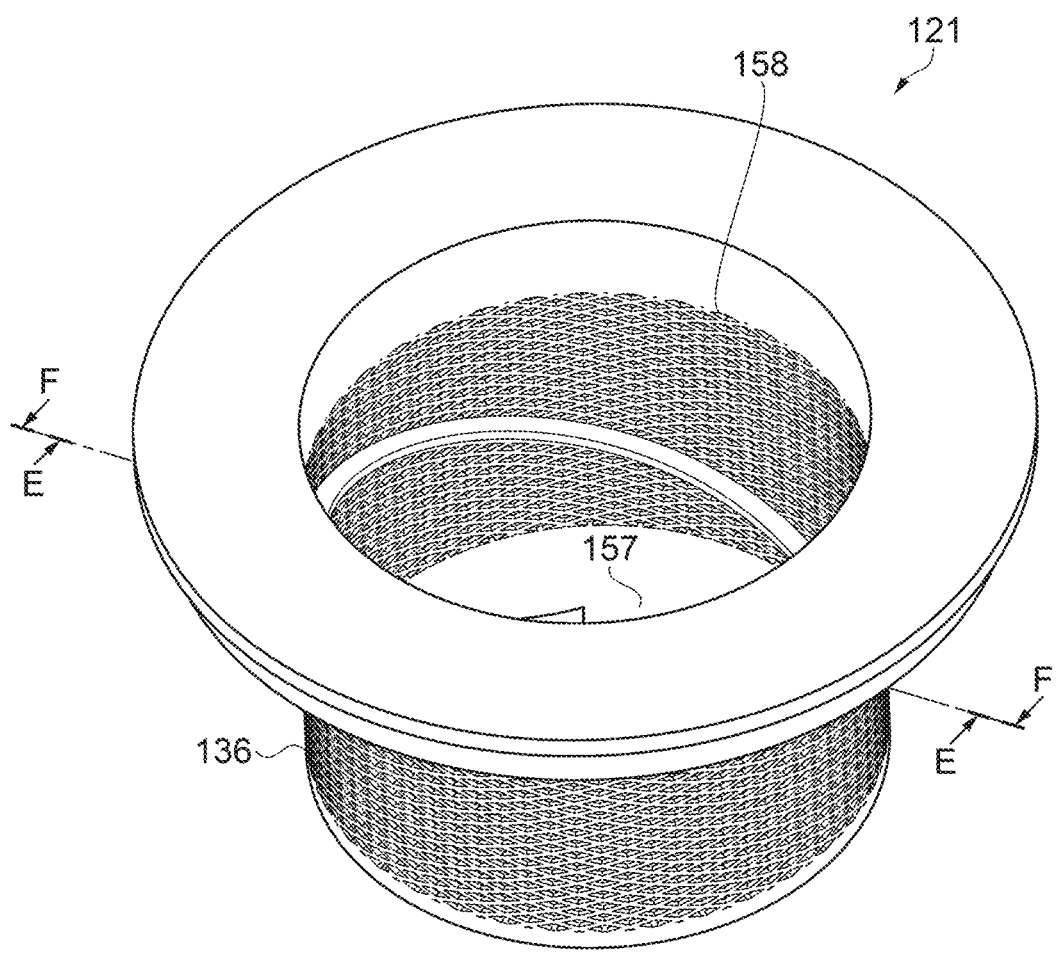
FIG. 22 is a perspective view showing a material cage.
Figure 23:
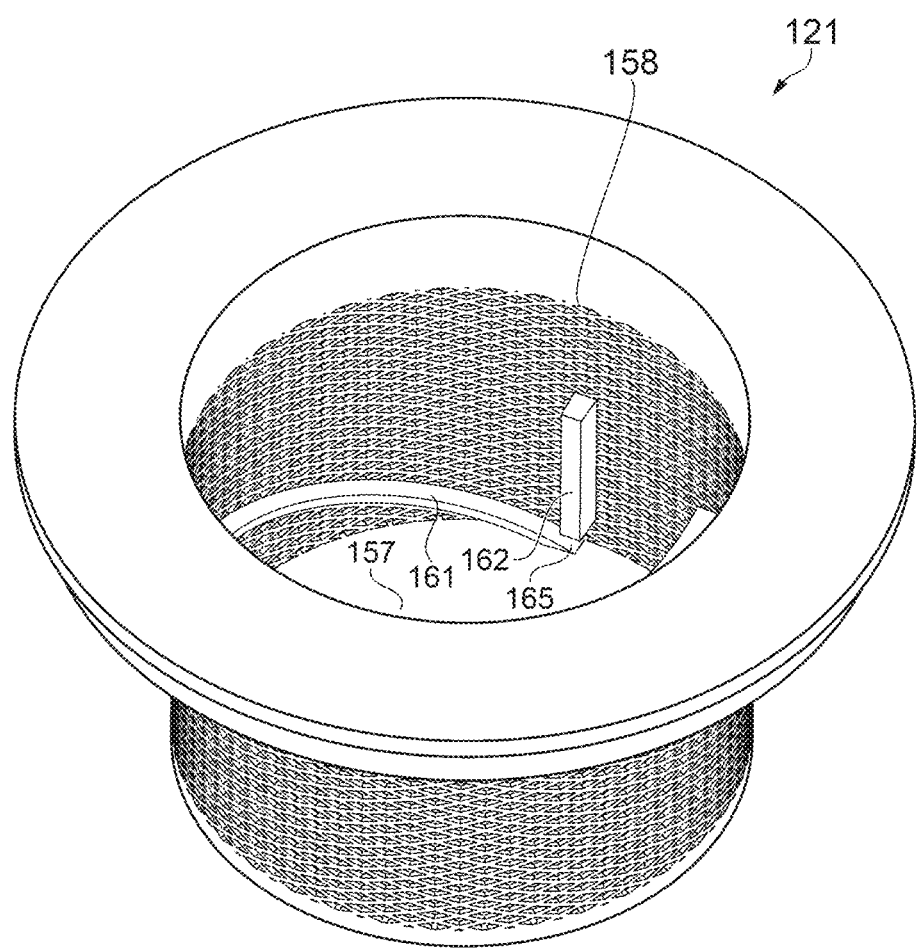
FIG. 23 is a perspective view showing the material cage.

As shown in FIG. 22, the cage portion 136 of the material cage 121 is formed to have a cylindrical shape having a bottom 157. A sidewall 158 of the cage portion 136 is formed to have a mesh shape. The cage portion 136 is an example of a mesh having a cylindrical shape. The sidewall 158 is an example of an inner wall of the mesh. When driving the suction pump 144 shown in FIG. 19 in a state where the material cage 121 is housed in the suction cage 124, suction force acts on the inside of the cage portion 136. In the state where the material cage 121 is housed in the suction cage 124, the sidewall 158 of the cage portion 136 faces the plurality of suction grooves 152 of the suction cage 124. As shown in FIG. 23, a guide rail 161 and a regulating member 162 are disposed on the sidewall 158 of the material cage 121. The guide rail 161 is a member that guides the granular material 19 housed in the material cage 121 to the outside of the material cage 121 little by little. The regulating member 162 is a member that regulates an amount of the granular material 19 to be placed on the guide rail 161.

Figure 24:
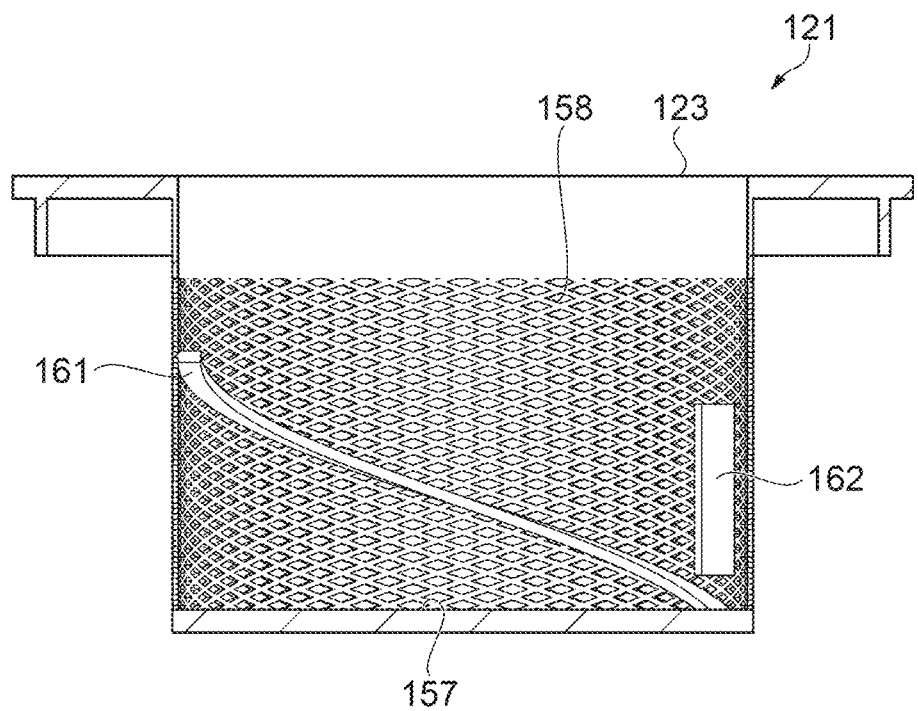
FIG. 24 is a cross-sectional view along the line E-E in FIG. 22.

As shown in FIG. 24, the guide rail 161 is disposed to form a spiral shape along the sidewall 158. The guide rail 161 is an example of a slope having a spiral shape. The guide rail 161 protrudes from the sidewall 158 toward the inside of the material cage 121 in the plan view. The guide rail 161 is disposed to form a spiral shape along the sidewall 158 from the bottom 157 toward the input port 123. The input port 123 is an end portion at an opposite side to the bottom 157 of the sidewall 158. The regulating member 162 protrudes from the sidewall 158 toward the inside of the material cage 121 in the plan view. The regulating member 162 extends from the bottom 157 side toward the input port 123 side. A gap is formed between the regulating member 162 and the bottom 157. The granular material 19 passing between the regulating member 162 and the bottom 157 is placed on the guide rail 161.

Figure 25:
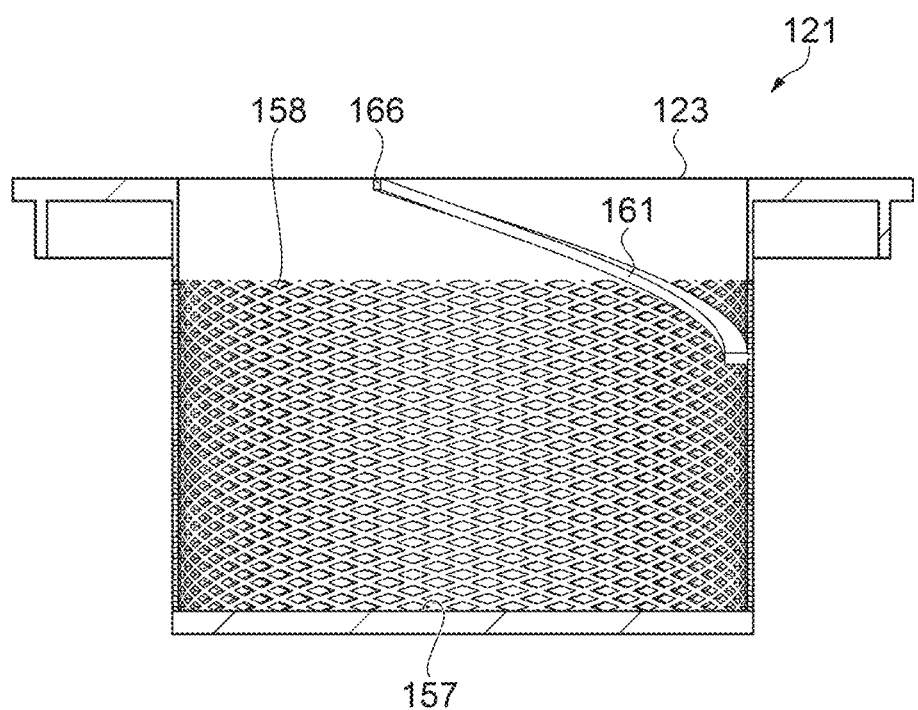
FIG. 25 is a cross-sectional view along the line F-F in FIG. 22.

Note that as shown in FIG. 23, one end 165 of the guide rail 161 is located between the regulating member 162 and the bottom 157. That is, the one end 165 of the guide rail 161 is located at a position overlapping the regulating member 162 in the plan view. As shown in FIG. 25, the guide rail 161 reaches the input port 123 of the sidewall 158. That is, the other end 166 of the guide rail 161 reaches the input port 123 of the sidewall 158. The guide rail 161 is disposed to have a spiral shape along the sidewall 158 from the bottom 157 to the input port 123. Accordingly, the guide rail 161 guides the granular materials 19 housed in the material cage 121 little by little along the sidewall 158 from the bottom 157 to the input port 123.

In the supply device 3A, by driving the suction pump 144 and the drive motor 145, the granular materials 19 housed in the material cage 121 can be supplied little by little from the input port 123 to the supply path 20. When the suction pump 144 is driven, a part of the granular material 19 housed in the material cage 121 is adsorbed to the sidewall 158. As described above, the plurality of suction grooves 152 are provided to the suction cage 124. When the suction pump 144 is driven, the suction force is generated toward the suction grooves 152 of the suction cage 124. Therefore, a part of the granular material 19 housed in the material cage 121 is sucked toward the suction grooves 152 via the sidewall 158.

At this time, when the drive motor 145 is driven, the suction grooves 152 also rotate with the rotation of the suction cage 124, and therefore, the granular material 19 adsorbed to the sidewalls 158 is dragged by the rotation of the suction grooves 152. That is, the granular material 19 on which the suction force acts toward the suction grooves 152 slides and moves on the sidewall 158 with the rotation of the suction grooves 152. When the granular material 19 sliding and moving on the sidewall 158 comes into contact with the regulating member 162, the granular material 19 that has passed between the regulating member 162 and the bottom 157 is placed on the guide rail 161. The granular material 19 placed on the guide rail 161 slides and moves on the sidewall 158 with the rotation of the suction grooves 152, and is guided to the input port 123 by the guide rail 161. Accordingly, in the supply device 3A, the granular materials 19 housed in the material cage 121 are supplied little by little from the input port 123 to the supply path 20.

Note that the supply device 3A is configured to rotate the suction cage 124 with respect to the material cage 121. However, the supply device 3A may be configured to rotate the material cage 121 with respect to the suction cage 124. Furthermore, the configuration of the supply device 3A may be a configuration in which both the suction cage 124 and the material cage 121 are rotated. According to the three-dimensional molding apparatus 1 including the supply device 3A, a large amount of the granular material 19 can be housed in the cage portion 136 of the material cage 121. When the gas located in the housing unit 148 is sucked by the suction pump 144 in a state where a large amount of the granular material 19 is housed in the cage portion 136, a part of the large amount of the granular material 19 is sucked to the sidewall 158 of the cage portion 136.

When the suction cage 124 is rotated in a state where a part of the granular material 19 is sucked by the sidewall 158 of the cage portion 136, the granular material 19 sucked by the sidewall 158 rotates along the sidewall 158 of the cage portion 136 together with the suction cage 124. The guide rail 161 having a spiral shape is provided to the sidewall 158 of the cage portion 136. Therefore, the granular material 19 rotating while sliding on the sidewall 158 of the cage portion 136 is pushed out of the cage portion 136 along the guide rail 161 having a spiral shape. That is, according to the supply device 3A, a large amount of the granular material 19 housed in the cage portion 136 can be separated to the outside of the cage portion 136 little by little. The granular material 19 separated little by little can be supplied to the plasticizing unit 17 of the discharge unit 2.

Figure 26:
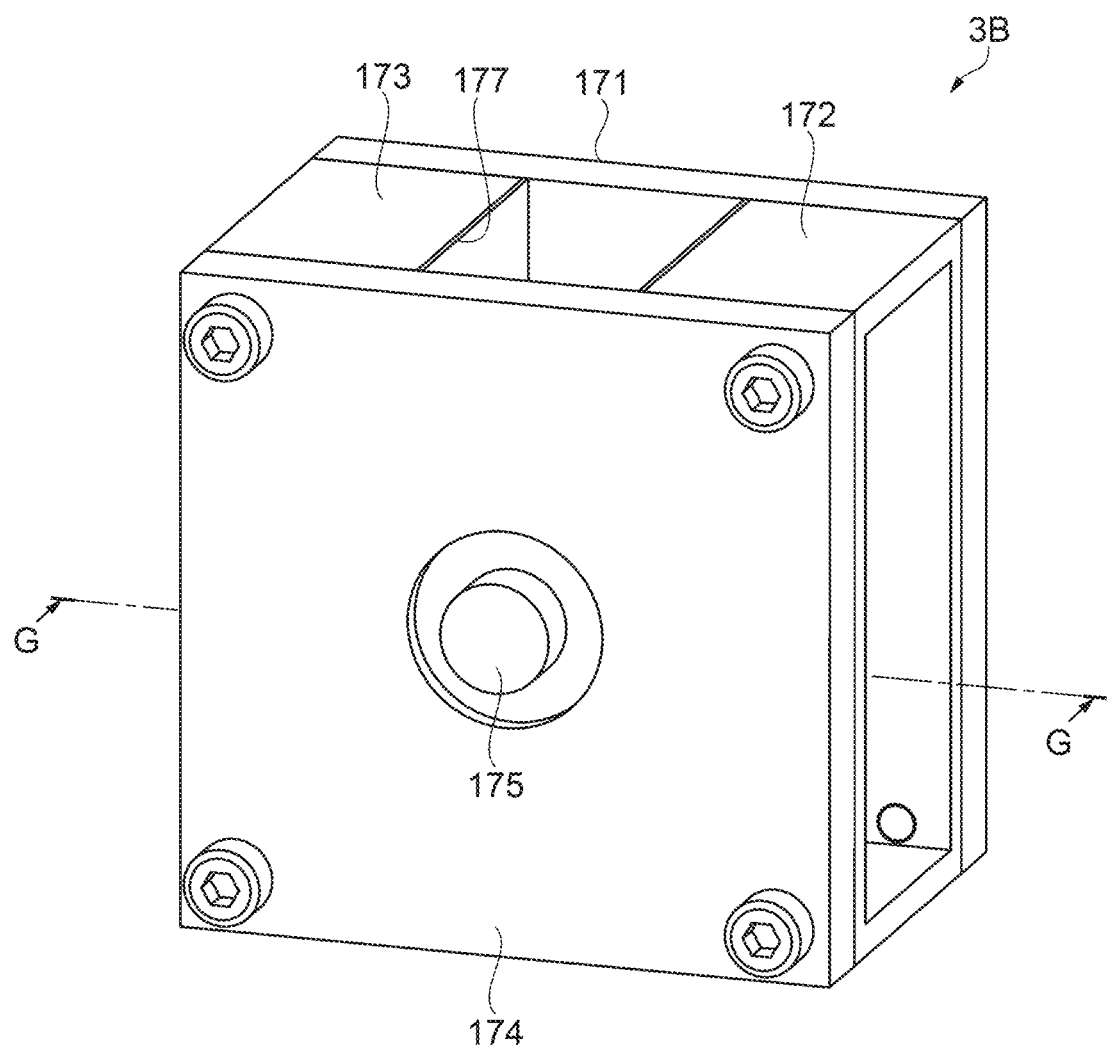
FIG. 26 is a perspective view showing a supply device in Example 2.

As shown in FIG. 26, a supply device 3B as an example of the supply device 3 includes a first fixing plate 171, a first frame member 172, a second frame member 173, a second fixing plate 174, and a roller 175. The supply device 3B is Example 2 of the supply device 3. The supply device 3B has an input port 177. The granular material 19 is input into the input port 177. In the supply device 3B, the granular material 19 input into the input port 177 can be discharged little by little from a discharge port described later. The supply device 3B is a device that supplies the granular material 19 little by little from the discharge port to the supply path 20 shown in FIG. 1.

Figure 27:
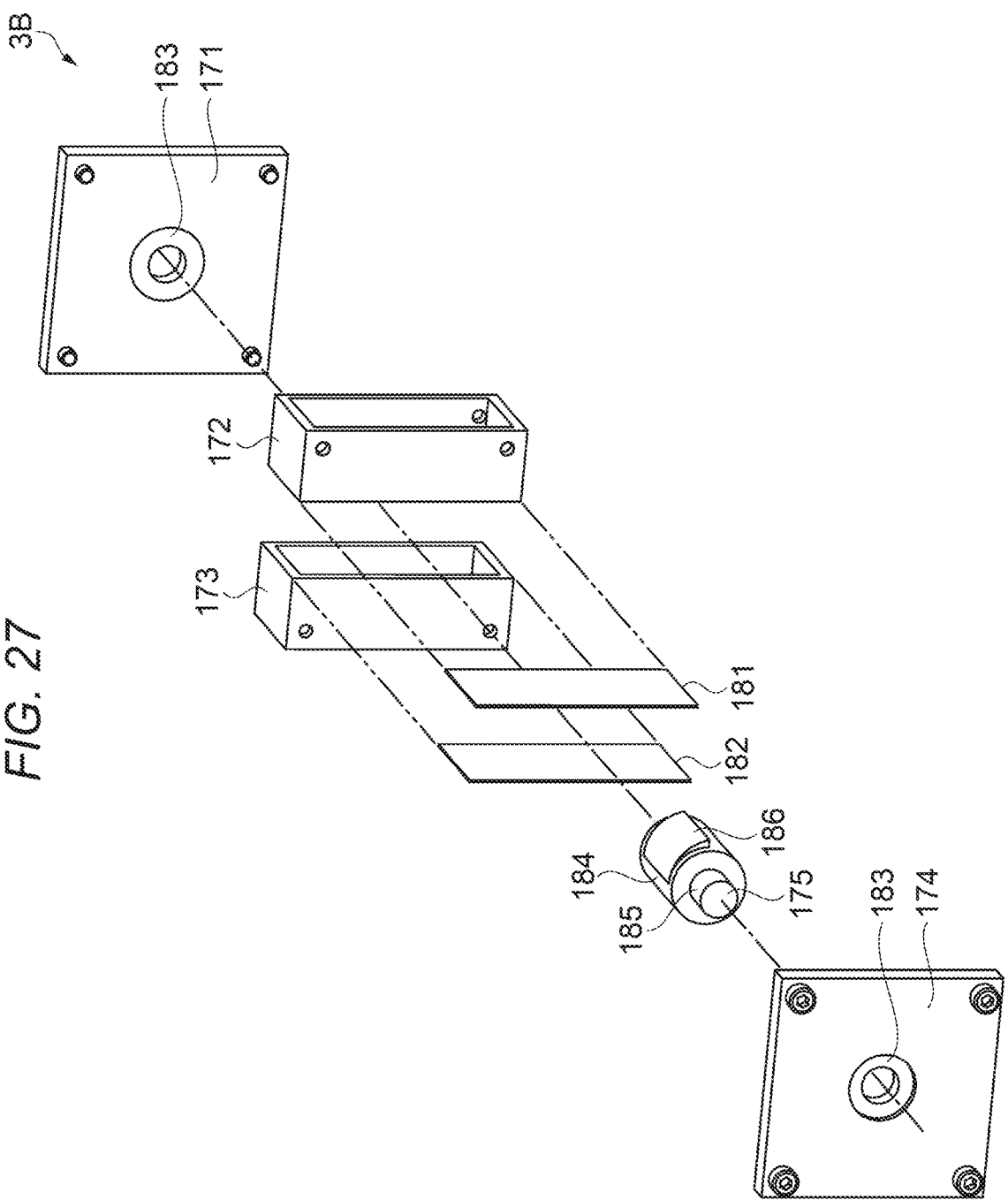
FIG. 27 is an exploded perspective view showing the supply device in Example 2.

As shown in FIG. 27, the supply device 3B further includes a first sidewall member 181 and a second sidewall member 182. Further, each of the first fixing plate 171 and the second fixing plate 174 includes a bearing 183. The bearings 183 are press-fitted into the first fixing plate 171 and the second fixing plate 174. The first frame member 172, the second frame member 173, the first sidewall member 181, the second sidewall member 182, and the roller 175 are disposed between the first fixing plate 171 and the second fixing plate 174.

As shown in FIG. 26, the first frame member 172 and the second frame member 173 are sandwiched by the first fixing plate 171 and the second fixing plate 174 in a state of forming a gap therebetween. The first frame member 172 and the second frame member 173 are each fixed to the first fixing plate 171 and the second fixing plate 174 with screws. When the supply device 3B is viewed in the direction from the second fixing plate 174 toward the first fixing plate 171, the bearings 183 are located between the first frame member 172 and the second frame member 173. A viewing direction in which the supply device 3B is viewed from the second fixing plate 174 toward the first fixing plate 171 is defined as a front of the supply device 3B.

As shown in FIG. 27, each of the first frame member 172 and the second frame member 173 has a frame shape. In each of the first frame member 172 and the second frame member 173, a hollow portion shaped like a frame is directed laterally when viewed from the front. The first sidewall member 181 is fixed to the first frame member 172. The first sidewall member 181 is fixed to a region opposed to the second frame member 173 out of the first frame member 172. The second sidewall member 182 is fixed to the second frame member 173. The second sidewall member 182 is fixed to a region opposed to the first frame member 172 out of the second frame member 173. That is, the first sidewall member 181 and the second sidewall member 182 are opposed to each other with a gap therebetween. The first sidewall member 181 closes a frame-shaped opening of the first frame member 172. The second sidewall member 182 closes a frame-shaped opening of the second frame member 173.

The first fixing plate 171, the second fixing plate 174, the first frame member 172, the second frame member 173, the first sidewall member 181, and the second sidewall member 182 constitute a container capable of containing the granular material 19. The roller 175 passes between the first sidewall member 181 and the second sidewall member 182 and is supported by the bearing 183 of the first fixing plate 171 and the bearing 183 of the second fixing plate 174. That is, the roller 175 passes between the first sidewall member 181 and the second sidewall member 182 and straddles the first fixing plate 171 and the second fixing plate 174. The roller 175 is configured to be rotatable via two bearings 183. The roller 175 is rotationally driven by power from a motor (not shown) coupled to one end of the roller 175.

The roller 175 includes a roller unit 184 and two shaft portions 185. The roller unit 184 is located between the two shaft portions 185. The shaft portion 185 extends from each of both ends of the roller unit 184. The two shaft portions 185 are respectively supported by the bearings 183. The length of the roller unit 184 along the rotational axis is shorter than the inner dimensions of the frames of the first frame member 172 and the second frame member 173. A convex portion 186 is formed on the outer circumference of the roller unit 184. The convex portion 186 is formed to be convex outward from the outer circumference of the roller unit 184.

Figure 28:
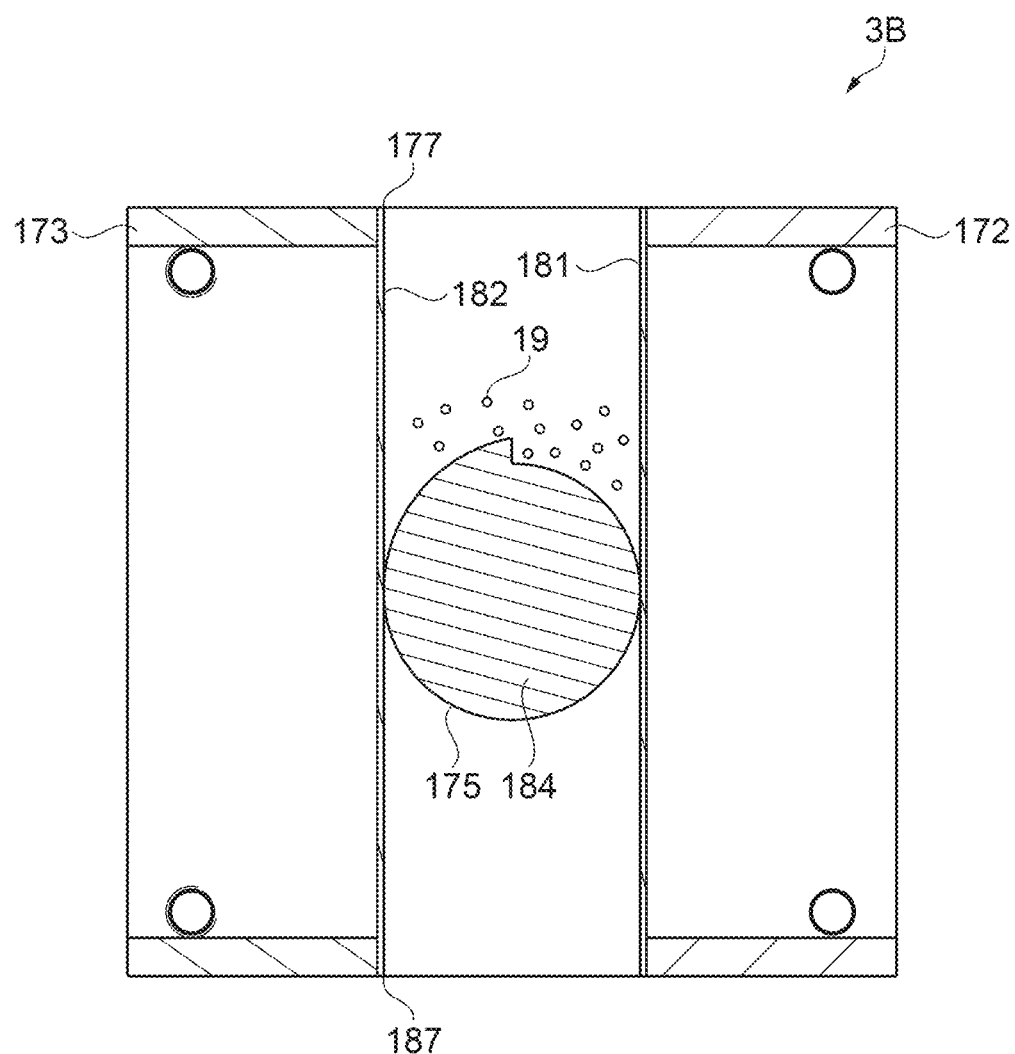
FIG. 28 is a cross-sectional view along the line G-G in FIG. 26.

FIG. 28 is a cross-sectional view along the line G-G in FIG. 26. As shown in FIG. 28, the outer circumference of the roller unit 184 is in contact with the first sidewall member 181 and the second sidewall member 182. The outer circumference of the roller unit 184 is sandwiched between the first sidewall member 181 and the second sidewall member 182. The first sidewall member 181 and the second sidewall member 182 are an example of two inner walls. Each of the first sidewall member 181 and the second sidewall member 182 is made of a sheet material having elasticity. The first sidewall member 181 and the second sidewall member 182 are stretchable. As the first sidewall member 181 and the second sidewall member 182, a fabric made of polyurethane fiber, nylon fiber, or the like, a rubber sheet, a sheet material obtained by combining these, or the like can be adopted. The supply device 3B has a discharge port 187 at an opposite side of the input port 177 across the roller 175. The granular material 19 input into the input port 177 is housed in a space partitioned by the roller 175, the first sidewall member 181, and the second sidewall member 182.

Figure 29:
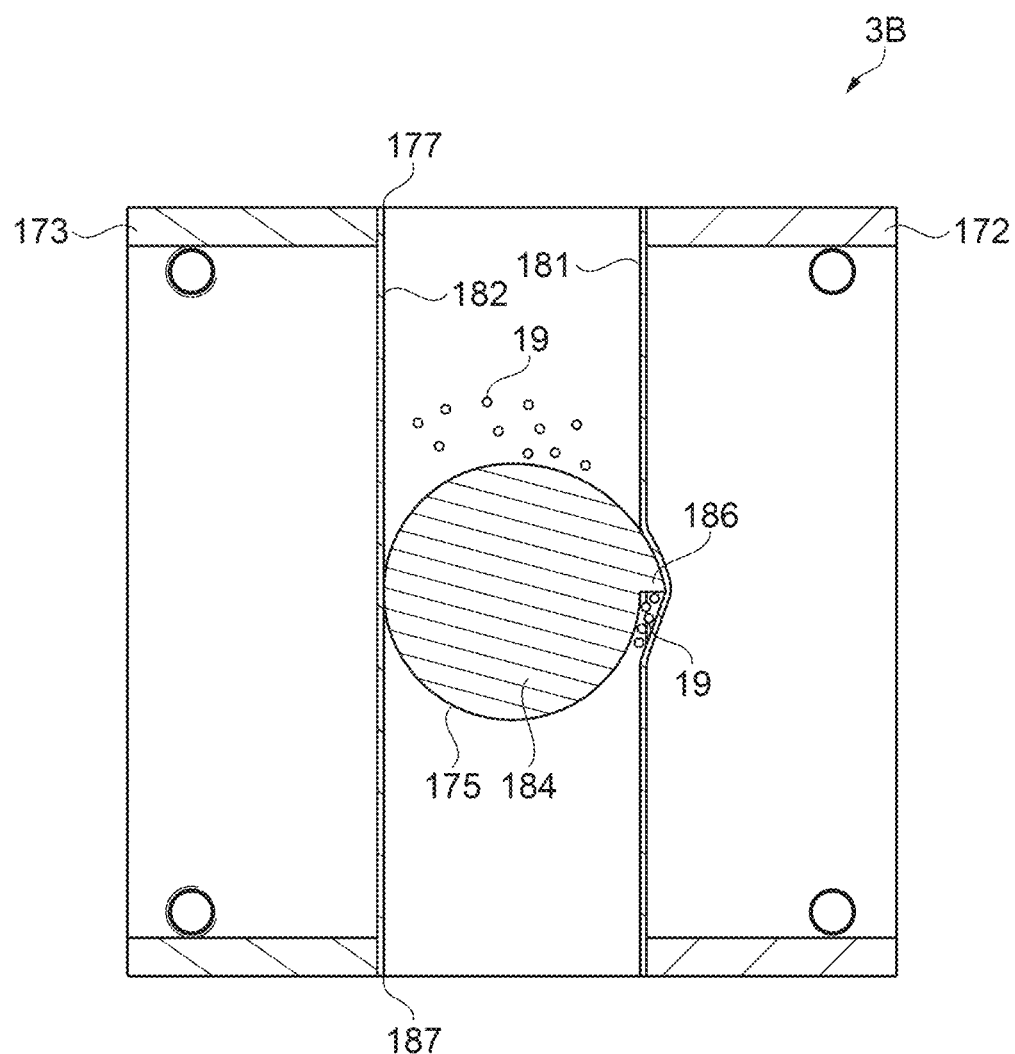
FIG. 29 is a cross-sectional view along the line G-G in FIG. 26.
Figure 30:
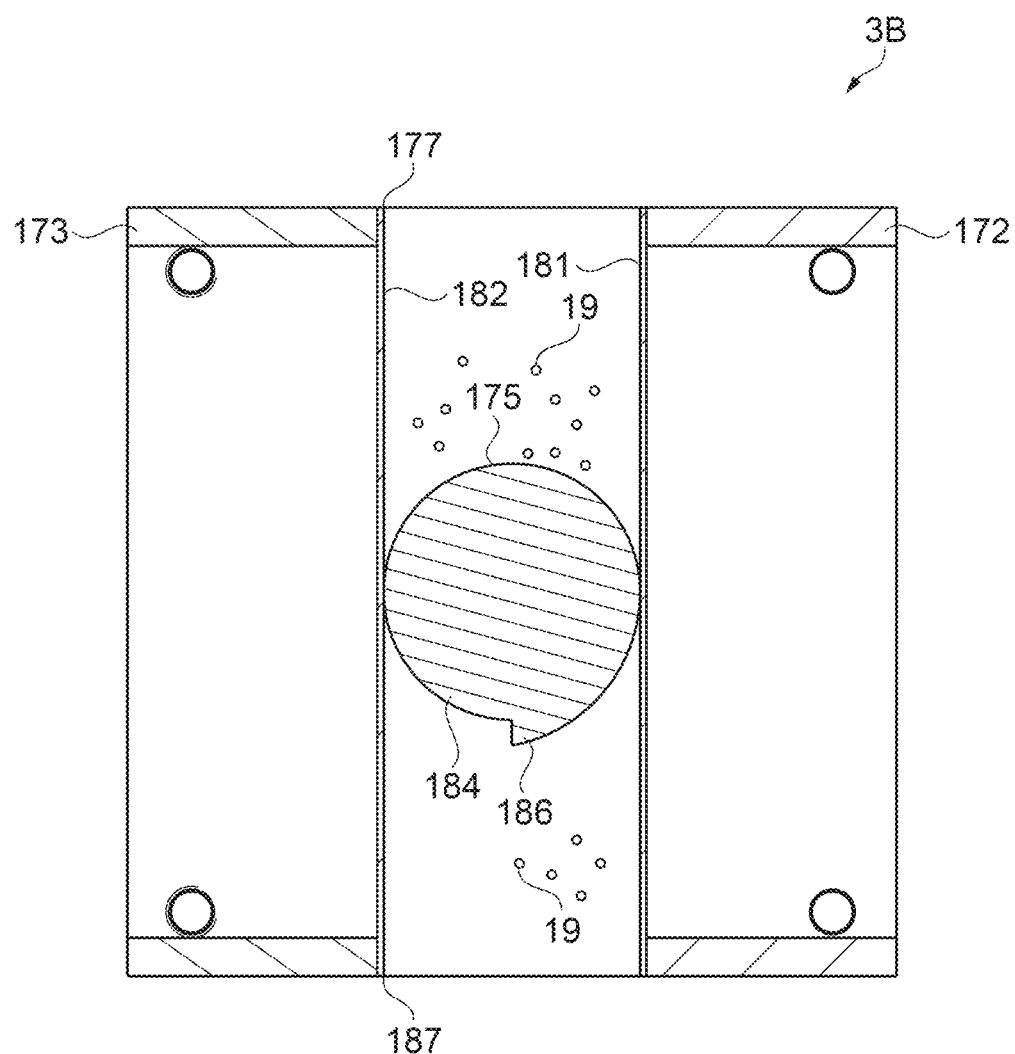
FIG. 30 is a cross-sectional view along the line G-G in FIG. 26.

As shown in FIG. 29, when the roller 175 is rotated, a small amount of the granular material 19 is pushed between the first sidewall member 181 and the roller 175 by the convex portion 186 of the roller unit 184. Since the first sidewall member 181 is stretchable, the first sidewall member 181 is bent by the convex portion 186 of the roller unit 184. As shown in FIG. 30, a small amount of the granular material 19 pushed by the convex portion 186 passes between the first sidewall member 181 and the roller 175 and is fed to the discharge port 187. Accordingly, in the supply device 3B, the granular material 19 input into the input port 177 is supplied little by little from the discharge port 187 to the supply path 20.

Figure 31:
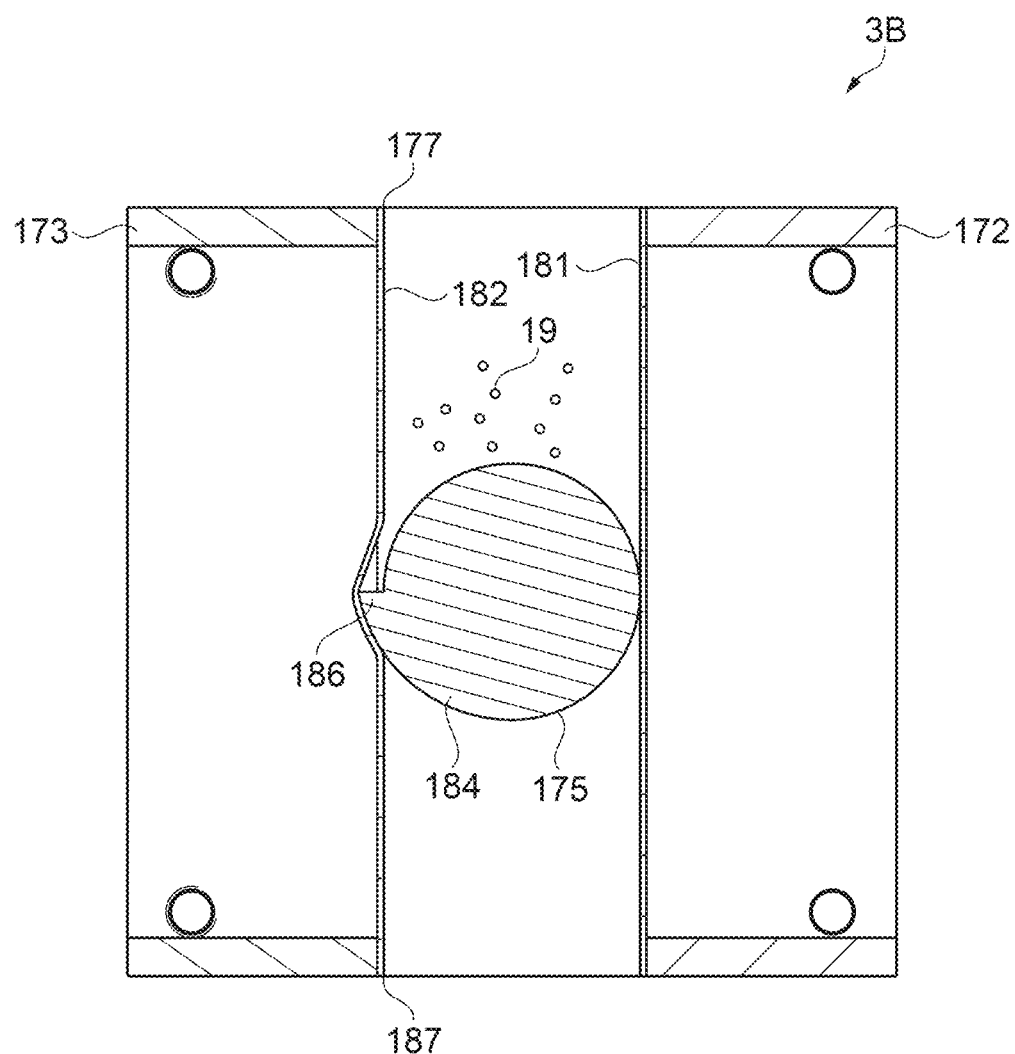
FIG. 31 is a cross-sectional view along the line G-G in FIG. 26.

As shown in FIG. 31, when the roller 175 is further rotated, the second sidewall member 182 is deflected by the convex portion 186 of the roller unit 184. Then, when the roller 175 is further rotated, as shown in FIG. 28, the convex portion 186 returns to the input port 177 side. According to the three-dimensional molding apparatus 1 including the supply device 3B, the convex portion 186 is formed on the outer circumference of the roller 175. Since the first sidewall member 181 and the second sidewall member 182 sandwiching the outer circumference of the roller 175 have elasticity, the convex portion 186 bends the first sidewall member 181 and the second sidewall member 182 when the roller 175 rotates. Therefore, the roller 175 can rotate even when it is sandwiched between the first sidewall member 181 and the second sidewall member 182.

When the roller 175 rotates, a part of the large amount of the granular material 19 input into the input port 177 can move to the discharge port 187 in a state of being sandwiched between the roller 175 and one of the first sidewall member 181 and the second sidewall member 182 due to the convex portion 186. Accordingly, according to the supply device 3B, a large amount of the granular material 19 input into the input port 177 can be separated little by little into the discharge port 187. The granular material 19 separated little by little can be supplied to the plasticizing unit 17 of the discharge unit 2.

Note that the supply device 3B includes the convex portion 186 on the outer circumference of the roller 175, but may include a concave portion instead of the convex portion 186. Since the granular material 19 is housed in the concave portion formed on the outer circumference of the roller 175, the granular material 19 can be moved to the discharge port 187 little by little. The roller 175 may include the convex portion 186 and the concave portion on the outer circumference thereof. Also in the configuration in which the convex portion 186 and the concave portion are provided to the outer circumference of the roller 175, the granular material 19 input into the input port 177 can be discharged little by little from the discharge port 187.

What is claimed is:

1. A molding stage comprising:
    a base which includes a molding surface on which a molding material to be used in three-dimensional molding is deposited,
    in which a first through hole penetrating the base along a first intersecting axis crossing a vertical axis perpendicular to the molding surface and a second through hole penetrating the base along a second intersecting axis crossing the vertical axis are formed, and in which the first intersecting axis and the second intersecting axis cross each other;
    a first slide member which is inserted into the first through hole, and which is configured to slide along the first intersecting axis between a first protruding position where the first slide member protrudes from the first through hole and a first housed position where the first slide member is housed in the first through hole; and
    a second slide member which is inserted into the second through hole, and which is configured to slide along the second intersecting axis between a second protruding position where the second slide member protrudes from the second through hole and a second housed position where the second slide member is housed in the second through hole, wherein the base includes a first recess and a second recess concave from the molding surface toward an opposite side to the molding surface of the base, the first through hole penetrates from a bottom of the first recess to the opposite side, the second through hole penetrates from a bottom of the second recess to the opposite side, the first slide member protrudes from the bottom of the first recess at the first protruding position and is retracted into the base from the bottom of the first recess at the first housed position, and the second slide member protrudes from the bottom of the second recess at the second protruding position and is retracted into the base from the bottom of the second recess at the second housed position.

2. The molding stage according to claim 1, wherein each of the first intersecting axis and the second intersecting axis is inclined along a direction getting closer to a central axis which is one of the vertical axes and passes through a center of the molding surface as proceeding from the molding surface toward an opposite side to the molding surface of the base.

3. The molding stage according to claim 1, wherein, in a plan view of the molding surface, the first through hole and the second through hole are located at positions symmetrical to each other about an axis passing through a center of the molding surface.

4. The molding stage according to claim 1, wherein the first slide member protrudes from the molding surface at the first protruding position and is retracted into the base from the molding surface at the first housed position, and
the second slide member protrudes from the molding surface at the second protruding position and is retracted into the base from the molding surface at the second housed position.

5. The molding stage according to claim 1, further comprising:
    a support member that is located at an opposite side to the molding surface of the base, that is configured to be raised and lowered with respect to the base, and that is configured to support the first slide member and the second slide member.

6. A three-dimensional molding apparatus comprising:
    the molding stage according to claim 1;
    a discharge unit including a nozzle configured to discharge the molding material; and
    a control unit configured to control the molding stage and the discharge unit, wherein
    the control unit is configured to control at least one of the nozzle and the molding stage such that a moving direction of the nozzle crosses the first through hole and the second through hole in a plan view of the molding surface.

7. A three-dimensional molding apparatus comprising:
    the molding stage according to claim 1;
    a discharge unit configured to discharge the molding material to the molding stage; and
    a supply device configured to supply a granular material, which is a raw material of the molding material, to the discharge unit, wherein
    the supply device includes a container configured to house a plurality of the granular materials, and a roller disposed in the container,
    the container includes two inner walls opposed to each other,
    the two inner walls have elasticity,
    an outer circumference of the roller is sandwiched between the two inner walls, and
    at least one of a convex portion and a concave portion is formed on the outer circumference of the roller.

8. A three-dimensional molding apparatus comprising:
    the molding stage according to claim 1;
    a discharge unit configured to discharge the molding material to the molding stage; and
    a supply device configured to supply a granular material, which is a raw material of the molding material, to the discharge unit, wherein
    the supply device includes a mesh having a cylindrical shape and configured to house a plurality of the granular materials,
a spiral slope disposed on an inner wall of the mesh,
a cylindrical body disposed outside the mesh and surrounding the mesh,
a rotation device configured to rotate at least one of the mesh and the cylindrical body around a central axis of the cylindrical body, and
a suction device configured to suck a gas located in the cylindrical body.

* * * * *